(12) United States Patent
Mach

(10) Patent No.: US 10,031,902 B1
(45) Date of Patent: Jul. 24, 2018

(54) SELECTIVE RETRIEVAL OF CONTENT FOR INCLUSION IN A LIST OF SEARCH RESULTS

(75) Inventor: Kimberly D. Mach, North Bend, WA (US)

(73) Assignee: THE BOEING COMPANY, Chicago, IL (US)

( * ) Notice: Subject to any disclaimer, the term of this patent is extended or adjusted under 35 U.S.C. 154(b) by 299 days.

(21) Appl. No.: 12/871,696

(22) Filed: Aug. 30, 2010

Related U.S. Application Data

(63) Continuation-in-part of application No. 12/415,750, filed on Mar. 31, 2009, now Pat. No. 8,825,636.

(51) Int. Cl.
*G06F 17/24* (2006.01)

(52) U.S. Cl.
CPC .................. *G06F 17/241* (2013.01)

(58) Field of Classification Search
CPC .......................... G06F 17/30867; G06F 17/241
USPC ......................................................... 707/705
See application file for complete search history.

(56) References Cited

U.S. PATENT DOCUMENTS

| 6,038,668 | A | 3/2000 | Chipman et al. | |
|---|---|---|---|---|
| 6,523,021 | B1 | 2/2003 | Monberg et al. | |
| 7,177,948 | B1 * | 2/2007 | Kraft et al. | 709/246 |
| 2005/0289106 | A1 * | 12/2005 | Petri et al. | 707/1 |
| 2006/0004716 | A1 * | 1/2006 | Hurst-Hiller et al. | 707/3 |
| 2006/0271524 | A1 * | 11/2006 | Tanne et al. | 707/3 |
| 2007/0266342 | A1 * | 11/2007 | Chang et al. | 715/810 |
| 2008/0005064 | A1 * | 1/2008 | Sarukkai | 707/3 |
| 2008/0034381 | A1 * | 2/2008 | Jalon et al. | 719/329 |
| 2008/0201326 | A1 * | 8/2008 | Cotter | G06F 17/30864 707/5 |
| 2008/0214156 | A1 * | 9/2008 | Ramer et al. | 455/414.1 |
| 2008/0222131 | A1 * | 9/2008 | Wang | 707/5 |
| 2008/0228821 | A1 | 9/2008 | Mick et al. | |
| 2008/0295007 | A1 | 11/2008 | Bernhardt | |
| 2009/0234815 | A1 * | 9/2009 | Boerries | G06F 17/30867 707/3 |
| 2009/0249248 | A1 * | 10/2009 | Burckart et al. | 715/810 |
| 2010/0031190 | A1 * | 2/2010 | Hall et al. | 715/806 |
| 2010/0082610 | A1 * | 4/2010 | Anick et al. | 707/723 |
| 2010/0250521 | A1 | 9/2010 | Mach | |

* cited by examiner

*Primary Examiner* — Neveen Abel Jalil
*Assistant Examiner* — Dawaune Conyers
(74) *Attorney, Agent, or Firm* — Toler Law Group, PC

(57) ABSTRACT

Methods, systems, and computer-readable storage media for modifying a search results display are provided. A particular method includes receiving a list including one or more search results generated in response to a query. Each of the one or more search results is associated with a document. A selection of a first document associated with a first search result of the one or more search results is received. Access is provided to content of the first document via a user interface. User input identifying at least a first portion of the first document is received via the user interface. A search results display including at least a portion of the list of the one or more search results is generated. The first portion of the first document is displayed with the first search result in the search results display.

22 Claims, 26 Drawing Sheets

Edit Search Results

Your Search [NASA launch]

( Save Search Results ) ( Print/Preview Results )

---

NASA - Ares Launch Vehicles
Future astronauts will ride to orbit on Ares I, which uses a single five-segment solid rocket booster, a derivative of the space shuttle's solid rocket booster, for the first stage. A liquid oxygen/liquid hydrogen J-2X engine derived from the J-2 engine used on Apollo's second stage will power the crew exploration vehicle's second stage. The Ares I can lift more than 55,000 pounds to low Earth orbit.
[X]

NASA launches test rocket on second try - Technology & science ...
Oct 28, 2009 ... NASA finally launched its experimental Ares IX test rocket Wednesday, ... report being released less than a week before the Ares I-X launch, ...
www.newsonline.com/id/1234324 - Cached page
[X]

NASA's Ares I-X Rocket Arrives at Launch Pad in Florida ...
Oct 20, 2009 ... CAPE CANAVERAL, Fla. - For the first time in more than a quarter century, a new vehicle is sitting at Launch Pad 39B at NASA's Kennedy Space ...
spaceinfo.com/.../nasa-s-ares-i-x-rocket-arrives-at-launch-pad-in-florida-.html -- Cached page
[X]

Mission: Ares 1-X
Oct 28, 2009 ... NASA is calling its Ares I-X test launch today a success after a day of delay due to weather. The rocket blasted off at 11.30 a.m. EDT (1630 ...

*FIG. 20*

SELECTIVE RETRIEVAL OF CONTENT FOR INCLUSION IN A LIST OF SEARCH RESULTS

CLAIM OF PRIORITY

The present application claims priority as a continuation-in-part of U.S. patent application Ser. No. 12/415,750, entitled "SEARCH RESULTS OUTPUT TOOL," filed on Mar. 31, 2009, which is incorporated herein by reference in its entirety.

FIELD OF THE DISCLOSURE

The present disclosure is generally related to selective retrieval of content for inclusion in a list of search results.

BACKGROUND

The Internet, enterprise networks, and other online databases and network information sources make large amounts of searchable information available to users. For example, by using a search engine to perform a query about a given topic via the Internet, a user may retrieve links to many more web pages or other documents related to the given topic than the user can process. Similarly, by performing a search regarding a product or service produced by an enterprise on an enterprise network or database, the user may identify many documents that pertain to the product or service.

After performing a search, the user may wish to save the search results for future reference. However, the user's ability to preserve the search results may be limited. For example, the user can print a list of search results using print capabilities of a browser. However, undesired content, such as irrelevant or undesired search results, sponsored links or other advertisements may be printed with the list of search results.

Some search engines may generate search results that include a snippet of text associated with each of the search results. The snippet may include computer selected information about the corresponding search result, such as a portion of a document that includes a search term from the query. However, since the snippet is computer selected, it may not include information that is useful to assist the user in determining the relevance of a particular search result.

SUMMARY

Embodiments disclosed herein include methods, systems, and non-transitory computer-readable media for modifying content included in a list of search results. Each of the search results may be associated with a document, such as a web page. A user may access a particular document by selecting a search result corresponding to the particular document in a user interface display. The user may select one or more portions of the particular document, such as one or more portions of text, one or more images, or both. The one or more portions that are selected may be added to the list of search results as summary information associated with the corresponding search result. If the list of search results already includes summary information associated with the corresponding search result (e.g., a computer generated snippet), the one or more portions that are selected may replace the previously existing summary information or may be added to the previously existing summary information in the list of search results. The user may also be able to remove one or more of the search results from the list of search results. Thus, the user may generate a modified list of search results that includes relevant search results and includes information that is useful to remind the user of the significance of particular search results.

In a particular embodiment, a method includes presenting, at a user interface of a computer system, a search results display including a list of search results received in response to a query of an electronic information source. The method also includes retrieving a document associated with a first search result in response to selection of the first search result from the list of search results. The method further includes presenting the document associated with the first search result and receiving user input selecting a selected portion of the document. The method also includes modifying the search results display, where the selected portion of the document is presented with the first search result in the modified search results display.

In another particular embodiment, a system includes a processor and a memory accessible to the processor. The memory includes instructions that are executable by the processor to present a search results display including a list of search results generated in response to a user query. A first search result of the list of search results is associated with a document accessible via an information source. The instructions are further executable by the processor to retrieve the document in response to a user selection of the first search result from the search results display. The instructions are further executable by the processor to receive user input selecting one or more portions of content of the document. The instructions are further executable by the processor to modify the search results display to include the one or more portions of the content of the document.

In another particular embodiment, a non-transitory computer-readable storage medium includes instructions that are executable by a processor to cause the processor to generate a search results display including a list of search results received in response to a query of an electronic information source. The instructions are further executable to cause the processor to retrieve a document associated with a first search result of the list of search results in response to a selection of the first search result in the search results display. The instructions are further executable to cause the processor to receive user input selecting a portion of the document. The instructions are further executable to cause the processor to generate a modified search results display, where the modified search results display includes the selected portion of the document associated with the first search result.

The features, functions, and advantages that are described can be achieved independently in various embodiments or may be combined in yet other embodiments, further details of which are disclosed with reference to the following description and drawings.

BRIEF DESCRIPTION OF THE DRAWINGS

FIG. 20 depicts a particular embodiment of a user interface display including the modifiable list of search results of FIG. 19 from which a portion of the content originally included in the list of search results of FIG. 16 has been removed;

DETAILED DESCRIPTION

In accordance with particular embodiments, a search results output tool is configured to print, store, or otherwise output records identified by one or more selected properties of each of one or more selected search results. Upon retrieving one or more search results, such as by using a search engine, one or more properties of each of the search results are stored in a dictionary. A user is prompted to select one or more of the search results and one or more of the properties associated with the search results. A record, such as a text block, is generated for each of the selected search results where the record for each of the search results includes the selected properties. Thus, the user is able to save or print the results of a search without having to save or print extraneous material and without having to individually access each of the search results to save or print the content of each of the search results.

Figure 1:
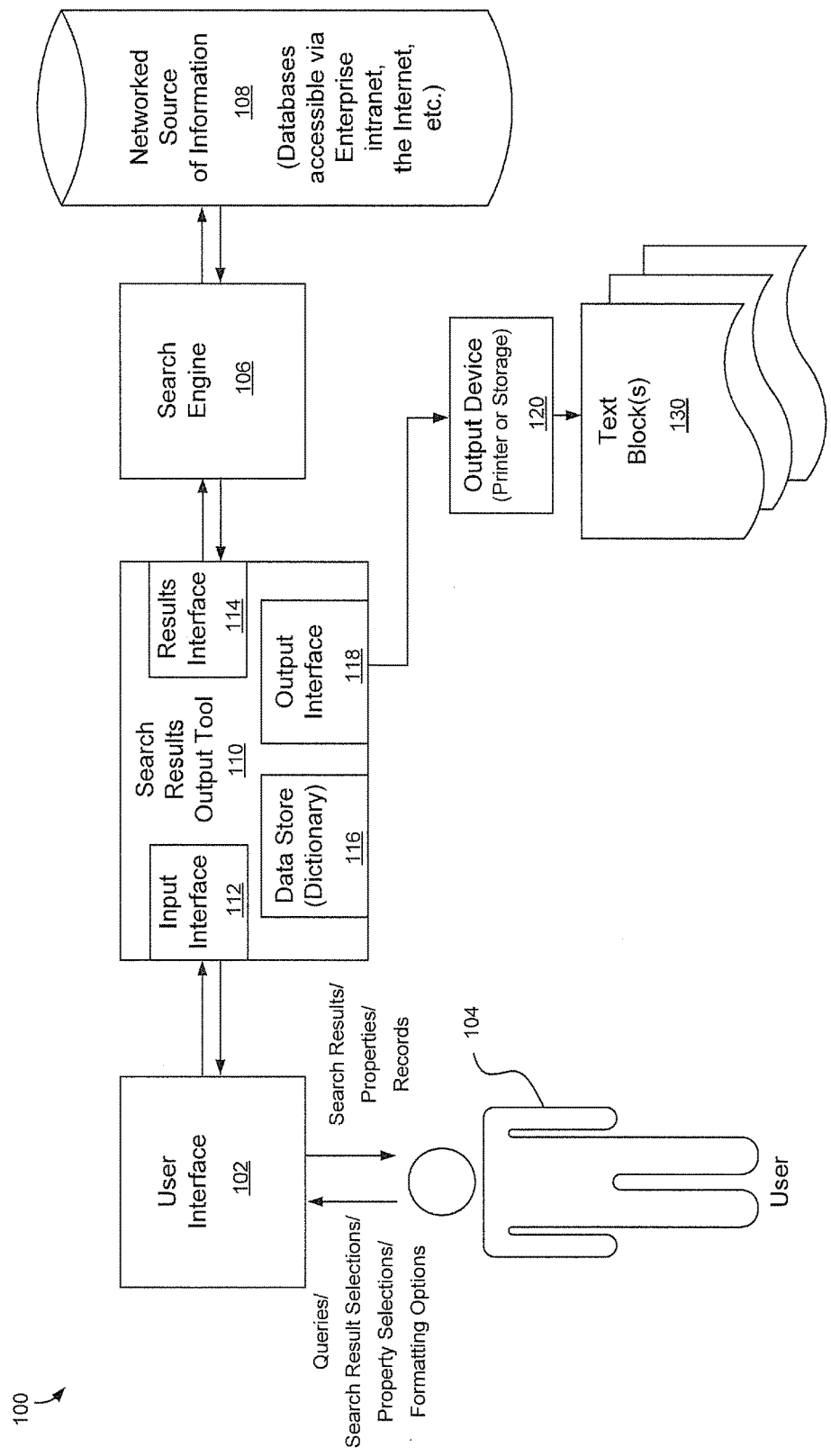
FIG. 1 is a block diagram of a particular embodiment of a search results output tool.

FIG. 1 is a block diagram depicting a particular embodiment of a system, generally designated 100, including a search results output tool 110 for generating text blocks 130 based on one or more selected properties associated with each of one or more selected search results. The system 100 includes a user interface 102 through which a user 104 engages the system 100. The system 100 also includes the search results output tool 110 that engages the user interface 102, a search engine 106, and an output device 120. The search engine 106 accesses a networked source of information 108 to perform one or more searches. The networked source of information 108 may include a database that may be accessed through an enterprise network, through the Internet, or through some other communications system. The output device 120 may include a printer to generate printed records of search results, such as the text blocks 130, or a storage device to store records of portions of search results generated in accordance with embodiments of the present disclosure.

The user interface 102 enables the user 104 to submit queries, to review search results, and to select search results and properties to be included in records generated for the selected search results. The user interface 102 may also enable the user 104 to review the records and to change formatting options for the records, as further described below.

The search results output tool 110 includes an input interface 112 that supports the user interface 102. After presenting user queries to the search engine 106 and receiving search results from the search engine 106 via a results interface 114, the search results output tool 110 presents the search results to the user 104 via the user interface 102. In a particular embodiment, the search results are presented to the user 104 in a selectable form via the user interface 102. Via the input interface 112, the search results output tool 110 also prompts the user 104 to select one or more search results for which records will be generated to be printed, stored, or otherwise output. Also via the input interface 112, the search results output tool 110 prompts the user 104 to select one or more properties to be displayed for the one or more selected search results and enables the user 104 to change the output format of the records of the one or more selected search results.

In a particular embodiment, when the search results output tool 110 receives search results of a query from the search engine 106 via the results interface 114, one or more properties associated with each of the search results are stored in a data store 116, such as a dictionary. By storing the properties associated with the one or more search results in the data store 116, when a user selects to print, store, or otherwise output information from one or more selected search results, the properties associated with each of the selected search results may be retrieved from the dictionary or other data store 116. By maintaining the properties in the dictionary or other data store 116, the search results output tool 110 may avoid having to again access the search engine 106 or the networked source of information 108 to retrieve the properties associated with the selected search results, thereby saving time and resources of the search engine 106 and the networked source of information 108.

Once the user 104 has selected one or more selected properties for one or more selected search results to be output, an output interface 118 generates the output. The output may be in the form of records that, in turn, may be in the form of text blocks 130 as further described below. The output may be directed by the output interface 118 to the output device 120. For example, when the output device 120 is a printer, the output may include printed output where the records presenting the selected properties for the selected search results are presented as printed text blocks 130. In another example, the output device 120 may be a storage device, such as a magnetic or optical disk or a FLASH memory, and the output may be in the form of stored records or a formatted file, such as a portable document format (.pdf) file, a text (.txt) file, or Microsoft Word document (.doc) file.

Thus, the search results and output tool 110 enables the user 104 to save selected search results that are of interest without printing or saving every web page or other document associated with the search results, and without print lists including every search result. The user 104 can also print or save only the portions of each of the selected search results that are of interest without printing or saving banner advertisements or other extraneous material that may have originally appeared with the search results.

Figure 2:
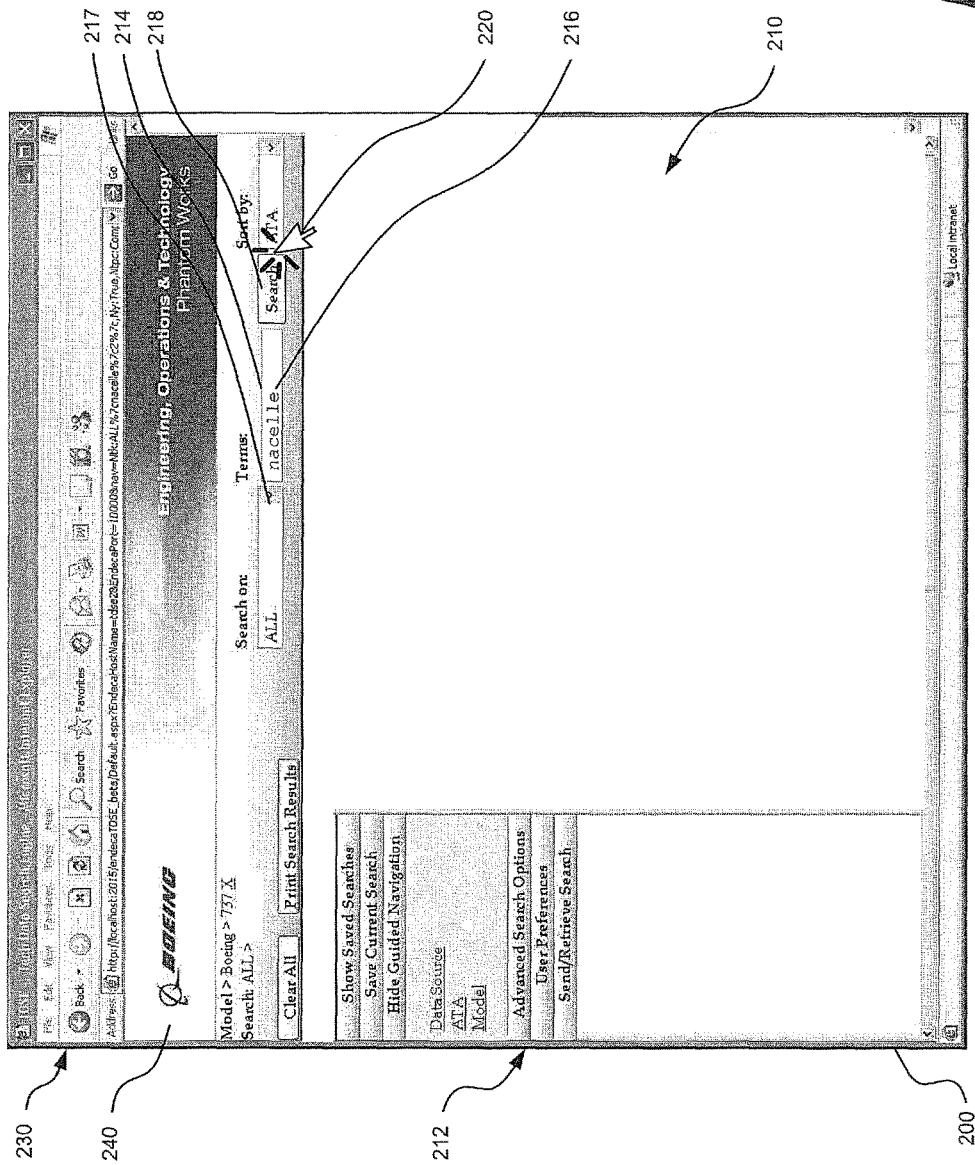
FIG. 2 depicts a particular embodiment of a user interface of a search engine.

FIG. 2 depicts a user interface 200 of a search engine that a user may employ to submit a query to a system, such as to the system 100. The user interface 200 represents an interface to an enterprise search engine that may be used to search one or more selected databases for enterprise documents, such as technical documentation or maintenance documentation for a plurality of objects developed, manufactured, marketed, serviced, maintained, or otherwise of interest to the enterprise. In an enterprise search, the search may be performed via an enterprise intranet or other enterprise networking system. One or more properties associated with each of the objects represented in the search results may include one or more categories selected by the enterprise. For example, the enterprise may select industry classification codes or enterprise-specific titles or product identifiers as properties to be associated with each of the search results. However, embodiments of the present disclosure may be used with search engines configured to access the Internet or any other type of network.

A results window 210 is provided in which search results generated in response to a query may be displayed. The user interface 200 for the search engine may include a variety of search options 212 that a user may select to tailor the search engine to the user's preferences. The user interface 200 also includes a search input field 214 where the user may enter one or more terms on which to perform a search. In the example of FIG. 2, the user has entered the term "nacelle" 216 in the search input field 214. The user interface 200 may include a search restriction control 217 that enables the user to restrict the search for the specified search terms to a particular database, document set, or other specified information source. The user may execute the search by selecting a search button 218, such as by manipulating a cursor 220 using a pointing device (not shown) to select the search button 218.

The search engine may be accessed using a browser application 230. The browser application 230 may include a print function configured to print the contents of pages displayed by the browser application 230. However, as previously described, such pages may include content, such as a banner 240, that the user may not want to print or that may be wasteful to print.

Figure 3:
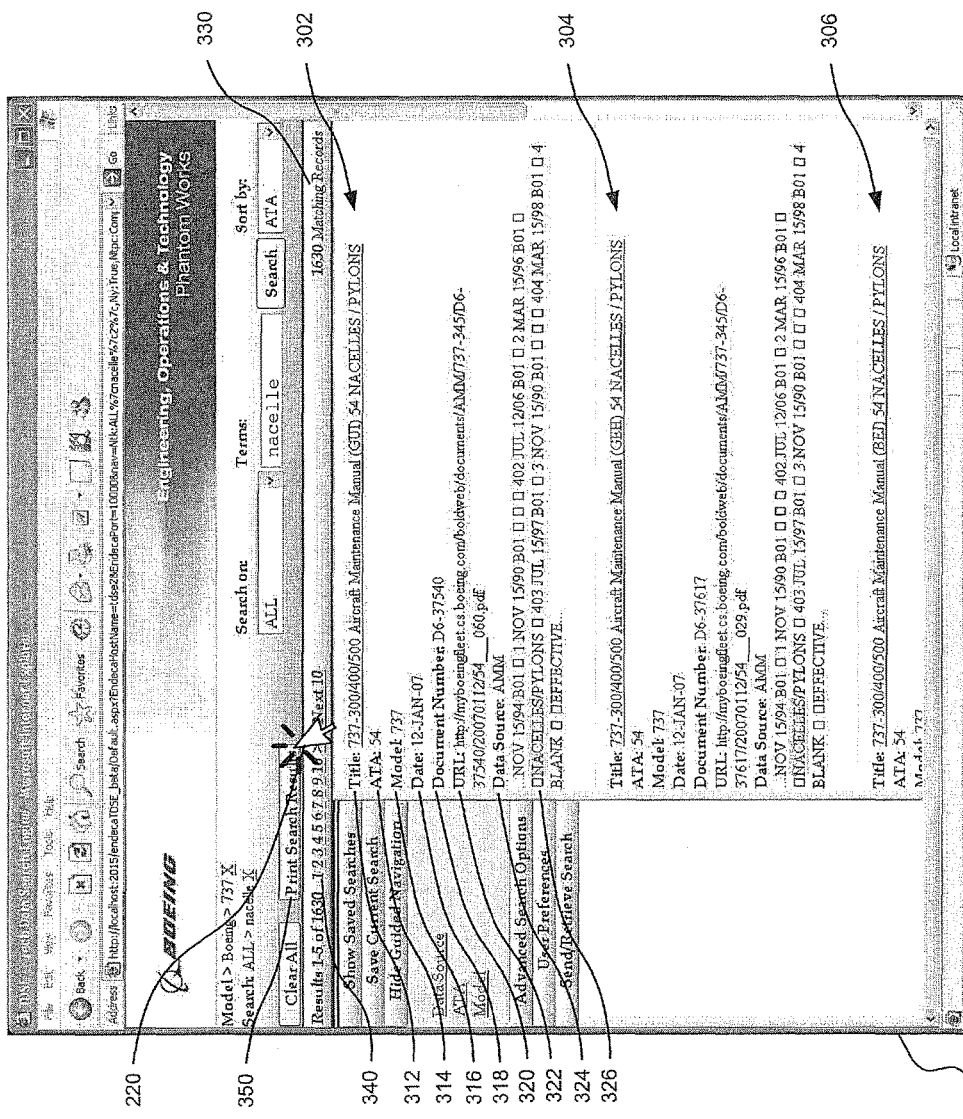
FIG. 3 depicts a particular embodiment of a user interface displaying a plurality of search results.

FIG. 3 depicts a user interface 300 displaying a plurality of search results 302-306 generated in response to the query of FIG. 2. Each of the search results 302-306 includes a number of entries or properties 312-326. For example, a first search result 302 includes a title 312, an air transport association (ATA) classification code 314, a model number 316, and a date 318 that is associated with the first search result 302. The first search result 302 also includes a document number 320, a uniform resource locator (URL) 322, a data source 324 for the first search result 302, and a segment 326 of the first search result 302 (i.e., a "snippet" of the first search result 302) that the user can use to assess the potential relevance of the first search result 302.

The user interface 300 shows a total number of search results 330 that are related to the query. Thus, in this example, the search results 302-306 are just a few of the 1630 search results generated by the query submitted by the user in FIG. 2. The user interface 300 also shows a page listing 340 listing pages over which the number of search results 330 is distributed. As previously described, using a print function of the browser application, the user may print pages of lists of search results or could access individual search results and print them. However, the browser application may not provide the capability for the user to identify selected search results from among the search results 302-306 or to identify selected properties from among the properties 312-326 that the user would like to save. In a particular embodiment, by using a search results output tool (such as the search results output tool 110 of FIG. 1, the user can identify selected search results and selected properties to be saved or output. For example, the user may implement a print search results function by selecting on a print search results option 350 (e.g., a button) using the cursor 220.

Figure 4:
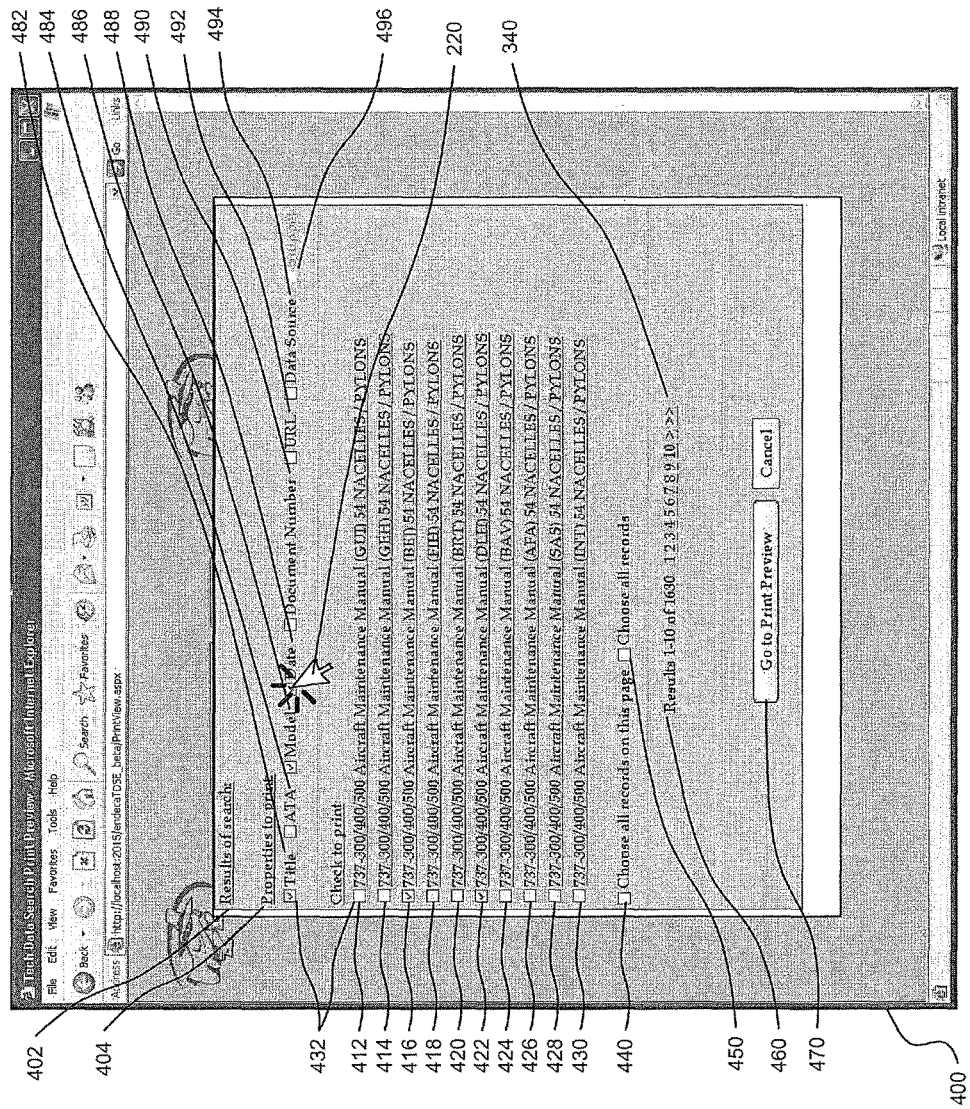
FIG. 4 depicts a particular embodiment of a user interface generated in response to the user's selection of the print search results function that enables the user to select search results and properties to be saved or printed.

FIG. 4 depicts a user interface 400 generated in response to the user's selection of the print search results option 350 of FIG. 3. The user interface 400 may enable the user to select search results and properties to be saved or printed. The user interface 400 includes a list of search results 402 of the search and a list of properties to print 404 from which the user may make selections. The list of search results 402 includes entries for a plurality of search results 412-430, including entries 412-416 which correspond to the search results 302-306 of FIG. 3. Each of the entries 412-430 for the search results, as well as entries 482-494 for properties, may include a selection field 432. For example, in FIG. 4 the selection fields 432 are illustrated as check boxes that the user can select or deselect by manipulating the cursor 220.

From among the entries 412-430 for the search results, the user may identify selected search results to be printed, saved, or otherwise output. The user may select individual entries from among the entries 412-430 for the search results, or the user can select an option 440 to select all records on a current page or an option 450 to select all records of all the search results. The user may navigate between pages of search results using the page listing 340 to select which of the search results the user wishes to select to be output.

In addition to selecting from among the entries 412-430 of the search results, the user may select which of the properties the user wishes to identify to be printed, saved, or otherwise output for each selected search result using entries 482-494 for the properties. The entries 482-494 for the properties may correspond the properties that were displayed in the user interface 300 of FIG. 3. For example the entries 482-494 for the properties may include a title entry 482, an ATA classification code entry 484, a model number entry 486, a date entry 488, a document number entry 490, a URL entry 492, and a data source entry 494. The entries also may include an entry 496 to print a "snippet" including a portion or a summary of the selected search results.

Once the user has selected one or more of the entries 412-430 representing one or more search results or other search results and one or more of the entries 482-496 representing properties, the user may implement a print preview function by selecting a print preview option 470, such as by manipulating the cursor 220. The print preview function may generate a list of records, which in one embodiment is in the form of text blocks, representing the selected search results and selected properties for the user to preview before printing, saving, or otherwise outputting.

Figure 5:
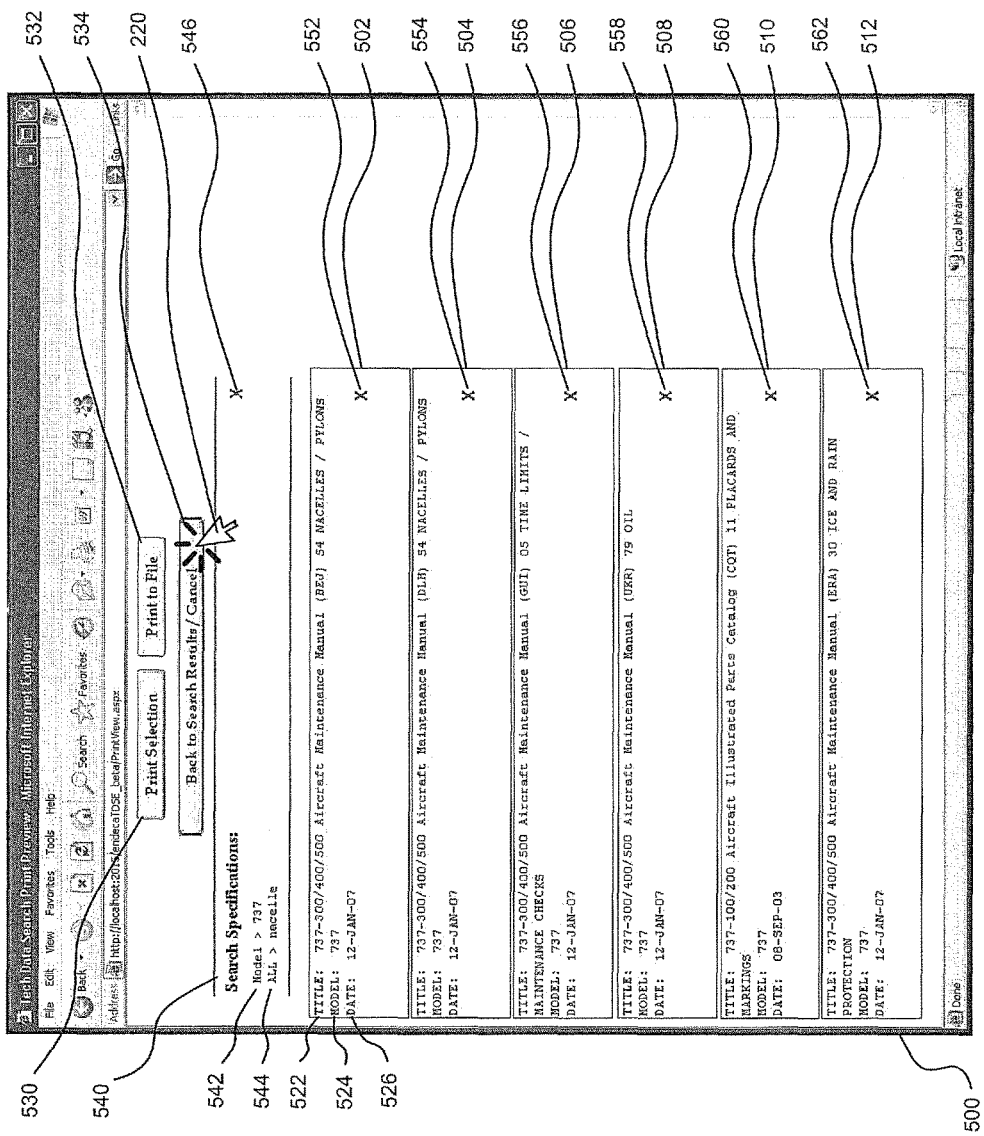
FIG. 5 depicts a particular embodiment of a user interface showing a preview of text blocks representing records including one or more selected properties for each of one or more selected search results that might be selected by the user from the user interface depicted in FIG. 4.

FIG. 5 depicts a user interface 500 showing a preview of text blocks representing records. The records include selected properties for each selected search results that was selected by the user from the user interface depicted in FIG. 4. The user interface 500 includes text blocks 502-512, representing six selected search results (of the 1630 search results indicated as the total number 330 of search results in FIG. 3). Moreover, instead of displaying all of the properties associated with the search results represented in the text blocks 502-512, the text blocks 502-512 list only three selected properties for each of the selected search results: a title 522, a model number 524, and a date 526. Thus, from the numerous search results and many properties that might be listed, the user is able to pare down the desired output to a relatively few text blocks 502-512 representing selected search results and relatively few selected properties 522-526 of interest. In paring down the output, for example, the user may save a great deal of paper, if the user chooses printed output, or the user may save a great deal of storage, if the user chooses to store the output. Each of the text blocks 502-512 includes a remove record option 552-562, respectively, which is shown as a selectable "X" associated with each of the text blocks 502-512 in FIG. 5. As further described below, the remove record option 552-562 may be used to deselect a particular search result to remove a record or text block representing the particular search result from the list of records.

The user may implement a print selection function by selecting a print selection option 530 to generate printed output to save the results of the search. Alternatively, the user may implement a print to file function by selecting a print to file option 532 to store the results of the search in a data file such as a .pdf file, .txt file, a .doc file, or another form of data file. In addition, the user may choose a back to results or cancel option 534 that, according to a particular embodiment, will return the user to a selection screen similar to user interface 400 to enable the user to modify the user's selection of search results or properties to be included in the output. According to a particular illustrative embodiment, the user interface 500 includes a search specifications display 540 that includes user search specifications the user has chosen for the search, such as a model number 542 and a search indication 544 (e.g., a for a search term "nacelle" 216 of all available information sources). According to an illustrative embodiment, the user may suppress the search specifications display 540 by selecting a cancel option 546 shown as a selectable "X" in FIG. 5.

Figure 6:
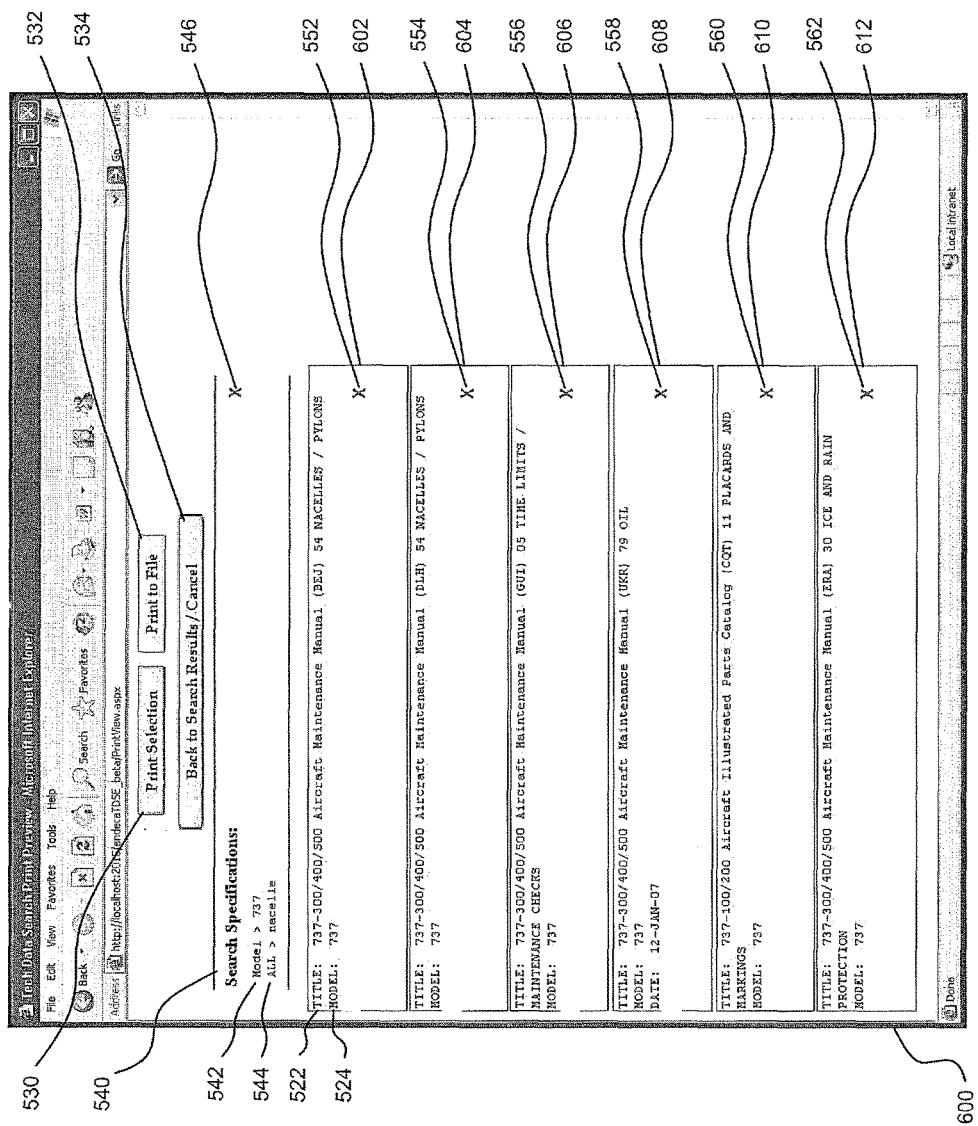
FIG. 6 depicts a particular embodiment of a user interface displaying modified records when the user has chosen to further modify the list of records represented in the text blocks of FIG. 5.

FIG. 6 depicts a user interface 600 displaying modified records 602-612 when the user has chosen to further modify the list of records represented in the text blocks 502-512 of FIG. 5. According to a particular embodiment, by selecting the back to search results or cancel option 534, the user may return to a selection screen, such as shown in FIG. 4, to deselect one of the previously selected properties. The text blocks 602-612 only include the title 522 and the model number 524 but no longer include the date property 526 (FIG. 5). The removal of the date property 526 (FIG. 5) shows that the user deselected the date property 526 so the date property would no longer be one of the selected properties shown in the records 602-612. If the user is satisfied with the list of records as it now appears, the user may select the print selection function 530 to print the selected results, the user may select the print to file option 532 to store the results of the search, or the user may select the back to search results or cancel function 534 to further modify the selected search results.

Figure 7:
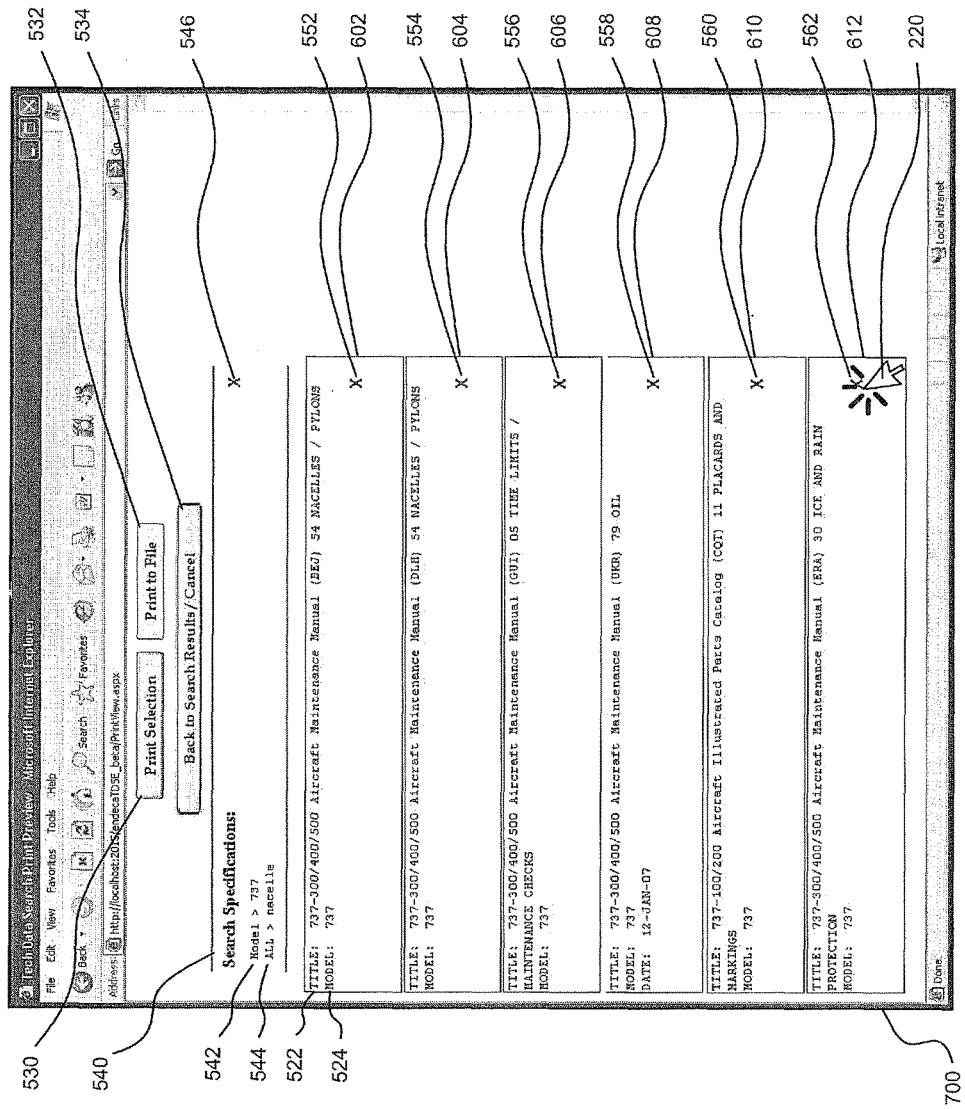
FIG. 7 depicts a particular embodiment of a user interface listing a subset of the records of FIG. 6 to illustrate how the user may choose to modify the records that appear in a list of records.

FIG. 7 depicts a user interface 700 listing a subset of the records 602-612 of FIG. 6. The user interface 700 illustrates how the user may choose to modify the records that appear in a list of records. As already described with reference to FIG. 6, after previewing the list of originally selected records 502-512, the user may choose the back to results or cancel option 534 to modify the selections the user previously made. Thus, for example, the user may return to the user interface 400 of FIG. 4 and deselect a search result represented by one or more of the records 602-612 by manipulating the selection field 432 of FIG. 4 associated with the search results to be selected. Then, by selecting the print preview option 470, the user interface 700 may be presented to show the modified list of the selected search results including the records that the user chose to continue to display.

As shown in FIG. 7, the user also may remove a record from the list of records shown in the user interface 700 by selecting the remove record option 552-562 associated with the record 602-612 that the user desires to remove from the list of records. For example, the user can manipulate the cursor 220 using a pointing device or other input device (not shown in FIG. 7) to select the remove record option 562 associated with the record 612.

Figure 8:
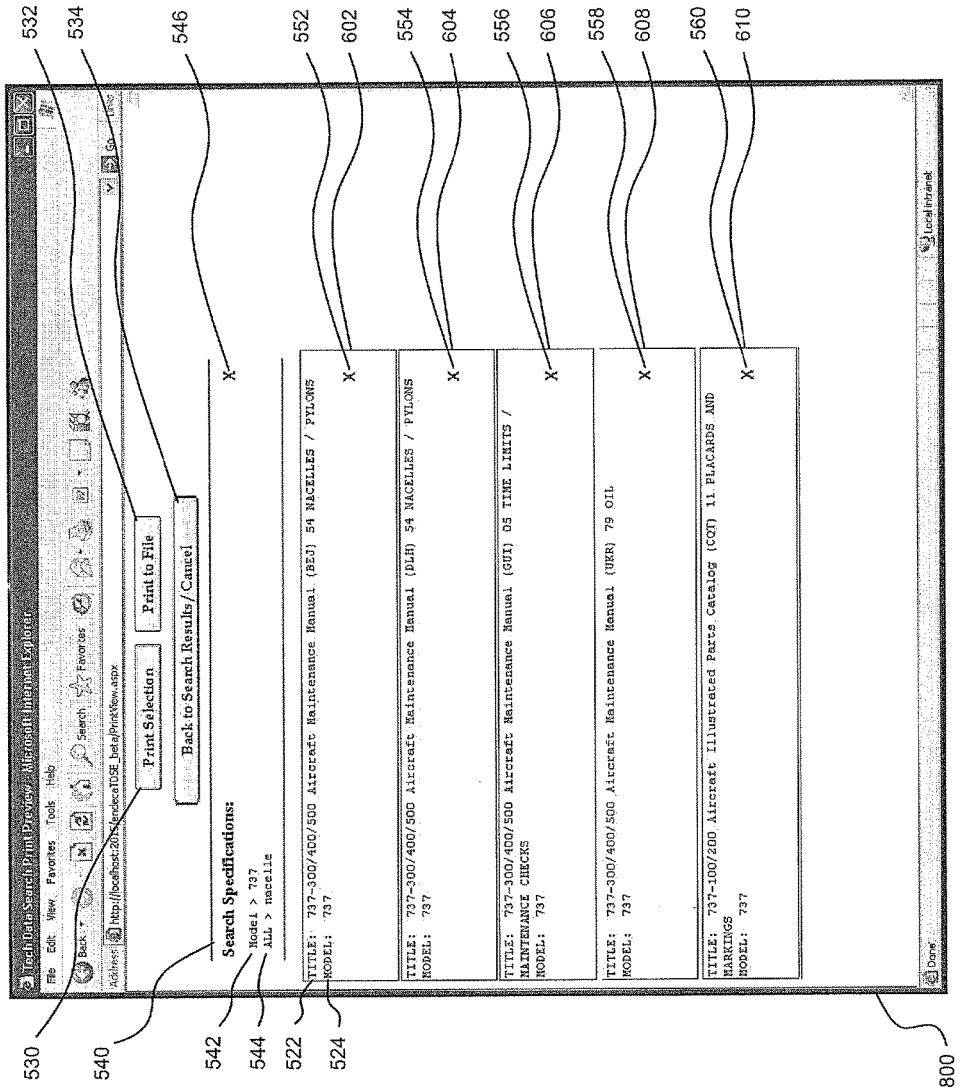
FIG. 8 depicts a particular embodiment of a user interface showing a modified list of records including records in response to the user's selection depicted in FIG. 7.

FIG. 8 depicts a user interface 800 showing a modified list of records including records 602-610. The modified list of records is modified relative to the user interface 700 of FIG. 7 in response to the user's selection described with reference to FIG. 7. Because the user selected the remove record option 562 associated with the record 612 of FIGS. 6 and 7, the record 612 was deselected and, thus, not included in the modified list of search results of FIG. 8. Similarly, by selecting the remove record option 552-560 associated with other records 602-610, additional records may be removed from the list of records displayed.

Figure 9:
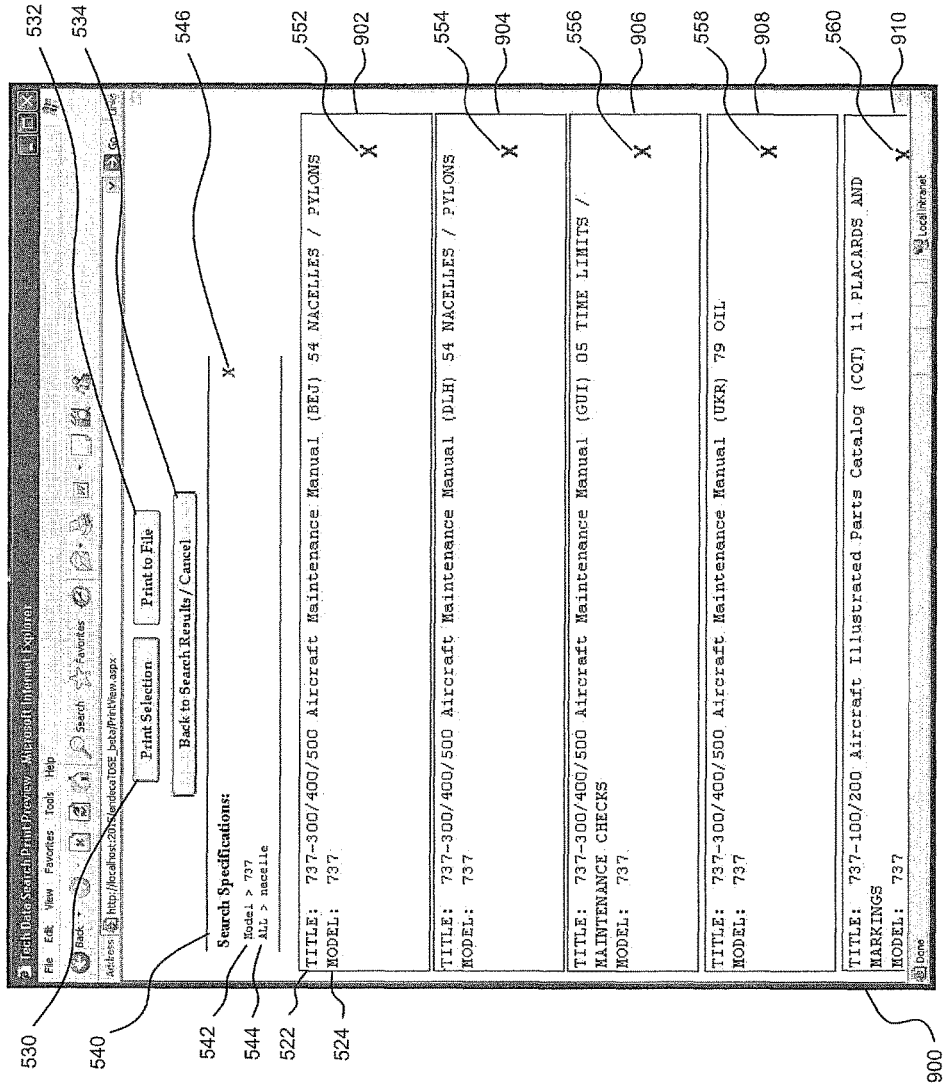
FIG. 9 depicts a particular embodiment of a user interface of a preview screen of the selected records and selected properties of the user interface depicted in FIG. 8 for which the user has selected to modify formatting options.

FIG. 9 depicts a user interface 900 of a preview screen of the selected records and selected properties of the user interface 800 depicted in FIG. 8 for which the user has selected to modify formatting options. For example, from the selected records 602-610 and selected properties 522 and 524 of FIG. 8, the user has selected to generate enlarged text blocks 902-910 for printing, saving, or other output. According to other embodiments, a user may change fonts, reduce the size of the text blocks, and make other adjustments to the output.

Figure 10:
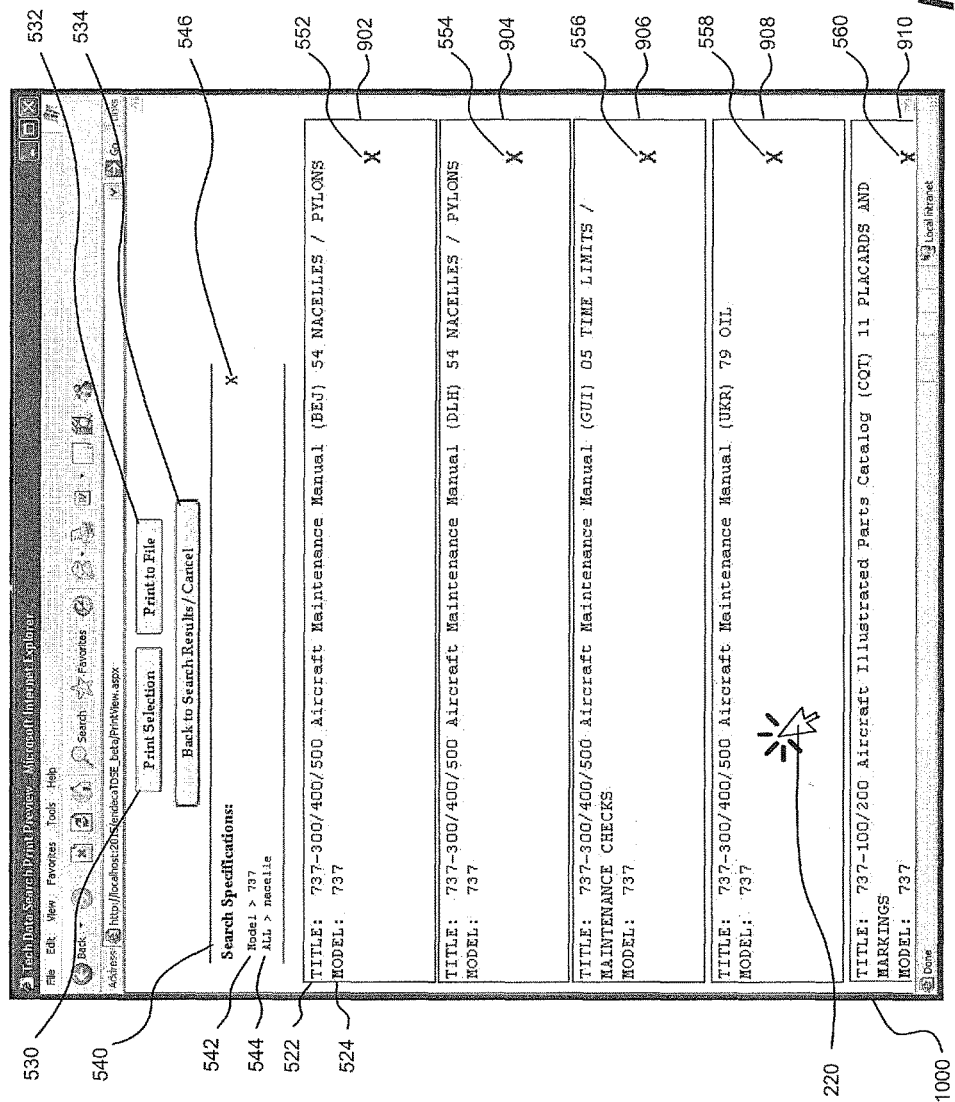
FIG. 10 depicts a particular embodiment of a user interface of a preview screen of the records of the user interface depicted in FIG. 9 for which the user has selected to move one of the records to change an order in which the records appear in the output that may be printed or saved.

FIG. 10 depicts a user interface 1000 of a preview screen of the records 902-910 of the user interface 900 depicted in FIG. 9 in which the user changed an order in which the records 902-910 appear in the output. According to a particular illustrative embodiment, the user may move one of the records 902-910 by using "drag and drop." To initiate moving one of the records 902-910, the user may, for example, manipulate a pointing device or other input device (not shown in FIG. 10) to direct a cursor 220 to select a desired record, such as the record 908 and to drag the selected record 908 to a desired location.

Figure 11:
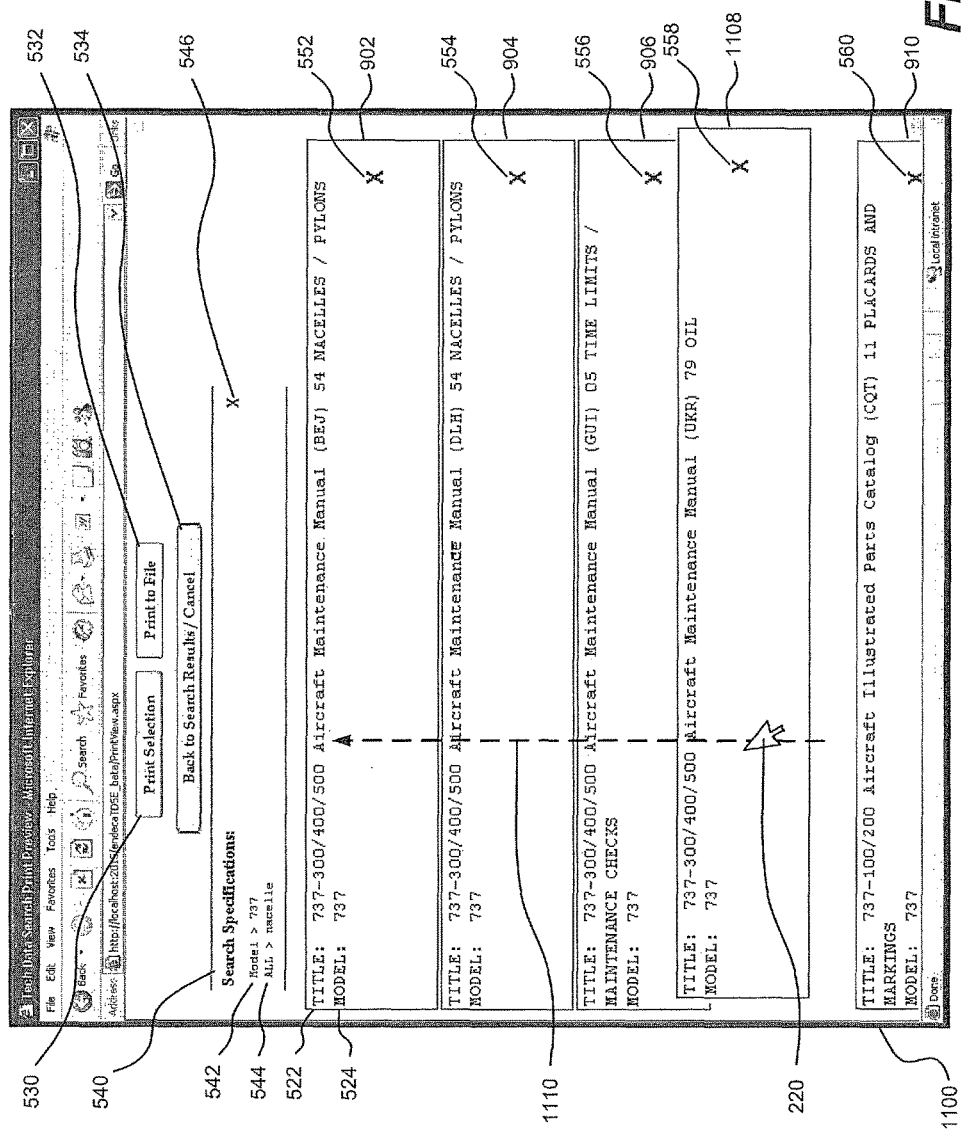
FIG. 11 depicts a user interface of a preview screen of the records in which the user is moving a record selected as depicted in FIG. 10 to another location among the other records.

FIG. 11 depicts a user interface 1100 of a preview screen of the records 902-910 in which the user has selected and is moving a selected record 1108 to another location among the other records 902-906 and 910. As shown in FIG. 11, the user may manipulate the pointing device or other input device (not shown in FIG. 11) to drag the selected record 1108 along a path 1110 to position the selected record 1108 first in the list ahead of the other records 902-906 and 910.

Figure 12:
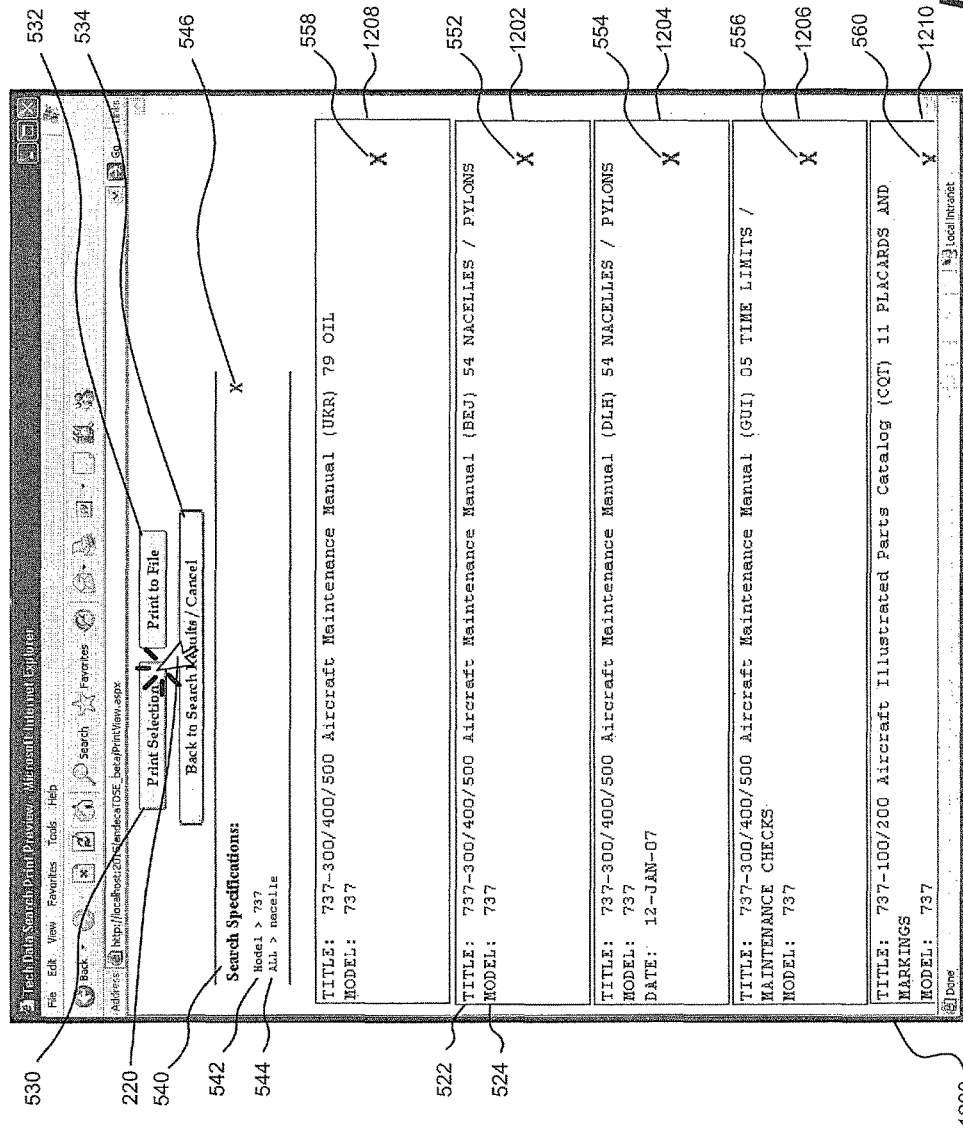
FIG. 12 depicts a particular embodiment of a user interface of a preview screen of reordered records based on the user's movement of the selected record as depicted in FIG. 11.

FIG. 12 depicts a user interface 1200 of a preview screen of reordered records 1202-1210 based on the user's movement of the selected record 1108 as depicted in FIG. 11. By dragging and dropping the selected record 1108 (FIG. 11), the selected record 1108 becomes a first record 1208 ahead of the other records 1202-1206 and 1210. The records that used to precede the record 1208 (e.g., the records 1202-1206) are repositioned to accommodate the new location of the record 1208. The user may continue to reposition the records 1202-1210 until the records 1202-1210 are in a desired order for printing or saving. Once the records 1202-1210 are in the desired order, the user may select the print selection option 530 or the print to file option 532. Alternatively, the user may select the back to search results or cancel option 534 to return to the selection screen of FIG. 4 to change the records or properties that are selected to be output.

Figure 13:
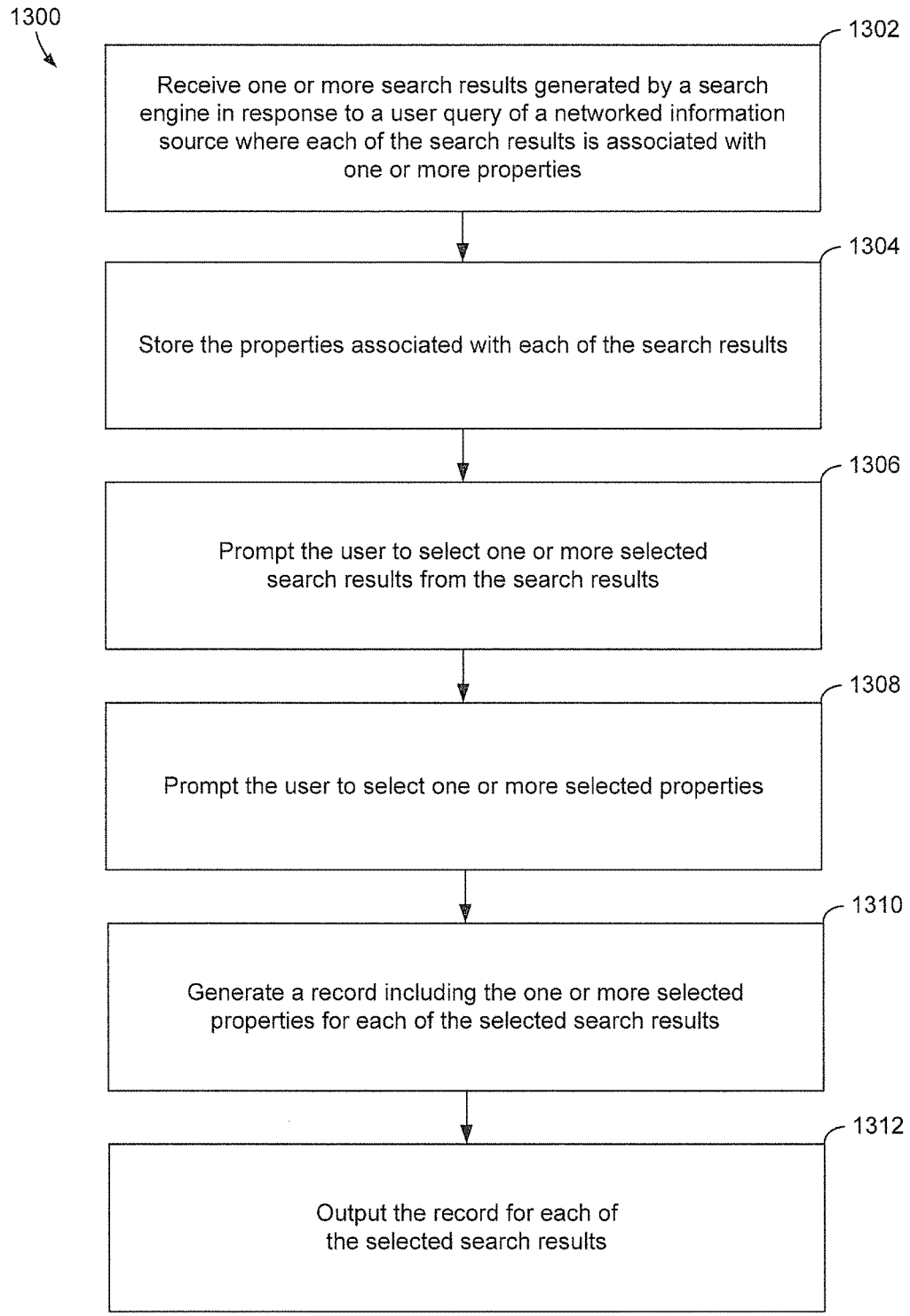
FIG. 13 is a flow diagram of a particular embodiment of a method of selectively outputting one or more properties of one or more selected search results.

FIG. 13 is a flow diagram 1300 of a particular illustrative embodiment of a method of selectively outputting one or more properties of one or more selected search results. One or more search results generated by a search engine are received in response to a user query of a networked information source where each of the search results is associated with one or more properties, at 1302. The properties associated with each of the search results are stored, at 1304. The user is prompted to select one or more selected search results from the search results, at 1306. The user is prompted to select one or more selected properties, at 1308. A record including the one or more selected properties for each of the selected search results is generated, at 1310. The record for each of the selected search results is output, at 1312.

Figure 14:
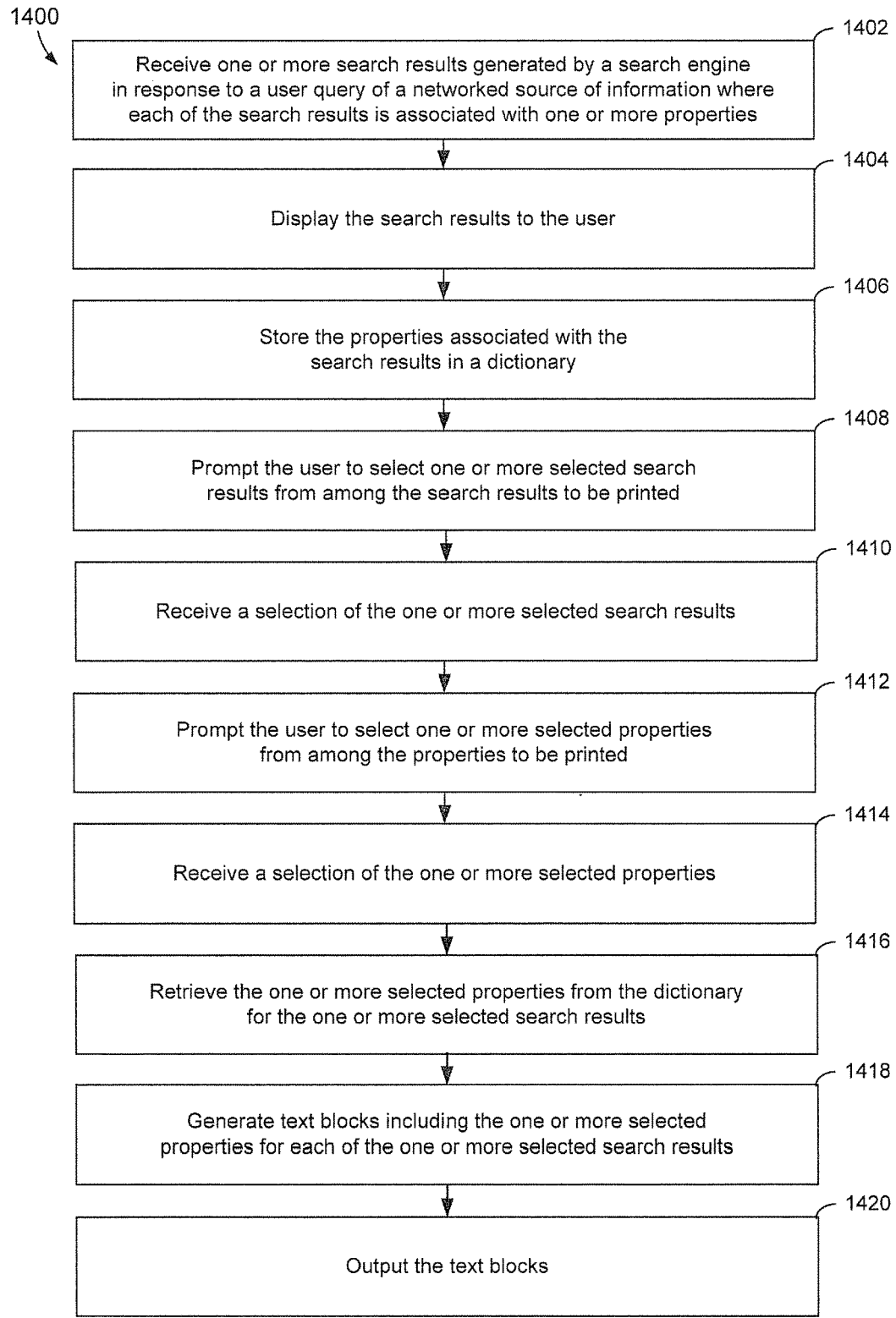
FIG. 14 is a flow diagram of a second particular embodiment of a method of selectively outputting one or more properties of one or more selected search results.

FIG. 14 is a flow diagram 1400 of another particular illustrative embodiment of a method. The method illustrated by the flow diagram may be manifested in instructions executable by a computing system to selectively output one or more properties of one or more selected search results. One or more search results generated by a search engine are received in response to a user query of a networked source of information where each of the search results is associated with one or more properties, at 1402. The search results are displayed to the user, at 1404. The properties associated with the search results are stored in a dictionary, at 1406. The user is prompted to select one or more selected search results from among the search results to be printed, at 1408. A selection of the one or more selected search results is received, at 1410. The user is prompted to select one or more selected properties from among the properties to be printed, at 1412. A selection of the one or more selected properties is received, at 1414. The one or more selected properties for the one or more selected search results are retrieved from the dictionary, at 1416. A list of text blocks including the one or more selected properties for the one or more selected search results is generated, at 1418. The list of text blocks is output, at 1420.

Figure 15:
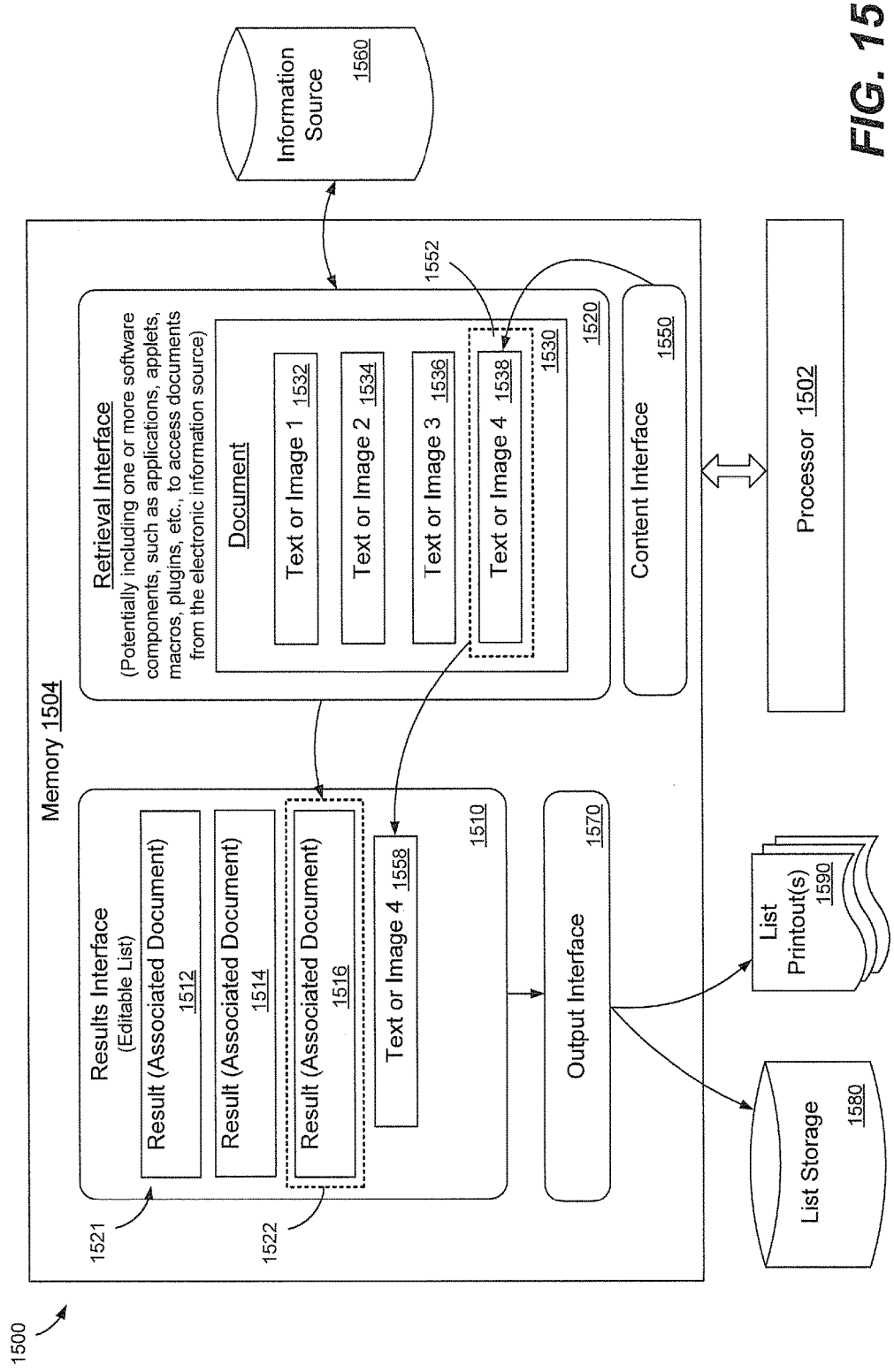
FIG. 15 is a block diagram of a particular embodiment of a system to modify a list of search results.

FIG. 15 is a block diagram of a particular embodiment of a system 1500 enabling a user to modify a list of search results to include selected content elements of one or more particular documents included in the list of search results. The system 1500 includes a processor 1502 in communication with a memory 1504 in which instructions are stored for execution. The instructions stored in the memory 1504 may be executable to provide a results interface 1510, a retrieval interface 1520, a content interface 1550, and an output interface 1570. The processor 1502 may communicate with an information source 1560, such as a database accessible via an intranet, the Internet, or another accessible electronic information source that is searchable in response to a user query. The output interface 1570 enables search results presented by the results interface 1510 to be preserved either by being stored in a list storage 1580 or by being printed, for example, as one or more list printouts 1590.

The results interface 1510 receives a list of search results 1521 retrieved from the information source 1560 in response to a query processed by a database manager or a search engine (not shown in FIG. 15). The results interface 1510 presents the list of search results 1521 in a search results display as an editable list. For example, the list of search results 1521 generated by the search engine (not shown in FIG. 15) may include search results 1512, 1514, and 1516. One or more of the search results 1512, 1514, and 1516 may correspond to a document, such as a web page or another type of document retrievable from the information source 1560. Some or all of the search results 1512, 1514, and 1516 may include one or more default content elements (such as text elements or image elements) from the corresponding documents. For example, a default content element may include a portion of the corresponding document that includes search terms presented to the search engine. The default content element may be computer selected to assist the user in determining why the particular document was included in the list of search results 1521.

In a particular embodiment, the default content element may not be of particular interest to the user. For example, when the default content element lists the search terms presented, the default content elements of some or all of the search results may be very similar in repeating the search terms that the user originally entered. Thus, if the user were to use the output interface 1570 to preserve the list of search results 1521, the preserved information may include little information to help the user or to remind the user why the list of search results 1521 was preserved.

According to a particular illustrative embodiment, the user may modify the list of search results 1521 so that the list of search results 1521 includes information to assist in determining why the list of search results 1521 was preserved. To modify the list of search results 1521, the user may select a particular search result. For example, the user may choose the search result 1516 as a selected search result 1522 by selecting the search result 1516. The retrieval interface 1520 may be invoked when the selected search result 1522 is selected. The retrieval interface 1520 may access and present a document 1530 corresponding to the selected search result 1522. The retrieval interface 1520 may include, for example, software components, such as applications, applets, macros, plug-ins, etc., to access documents from the electronic information source 1560 and to generate the selected search result 1522 as a viewable document.

The document 1530 may include several content elements 1532, 1534, 1536, and 1538, each of which may include a portion of text or one or more images. The text or images, for example, may constitute elements in a hypertext markup language (HTML) web page that may be generated by a browser from an HTML data stream. One or more of the content elements 1532, 1534, 1536, and 1538 may be of particular interest to the user. For example, a fourth content element 1538 may be particularly related to a purpose behind the user search. Thus, the user may wish to include the fourth content element 1538 in the list of search results 1521. For example, when the fourth content element 1538 includes a portion of text or one or more images of interest, the user may select the fourth content element 1538 as a selected content element 1552. A content interface 1550 may copy or otherwise extract the fourth content element 1538 from the particular document 1530 and insert the fourth content element 1538 into the list of search results 1521 as user selected content element 1558. The fourth content element 1538 may be inserted in addition to or in place of default content included in the list of search results 1521 by the search engine, as further described below with reference to FIGS. 19 and 20.

With content elements from one or more of the documents corresponding to the search results 1512, 1514, and 1516 included in the list of search results 1521, the user may have a useful list of search results 1521 that he or she may wish to save. The user may then preserve the list of search results 1521 by engaging the output interface 1570 to save the list of search results 1521 to the list storage 1580 or to generate a list printout 1590. FIGS. 16-23 depict examples of how the user can use the system 1500 to modify and preserve a list of search results 1521 according to particular illustrative embodiments.

Figure 16:
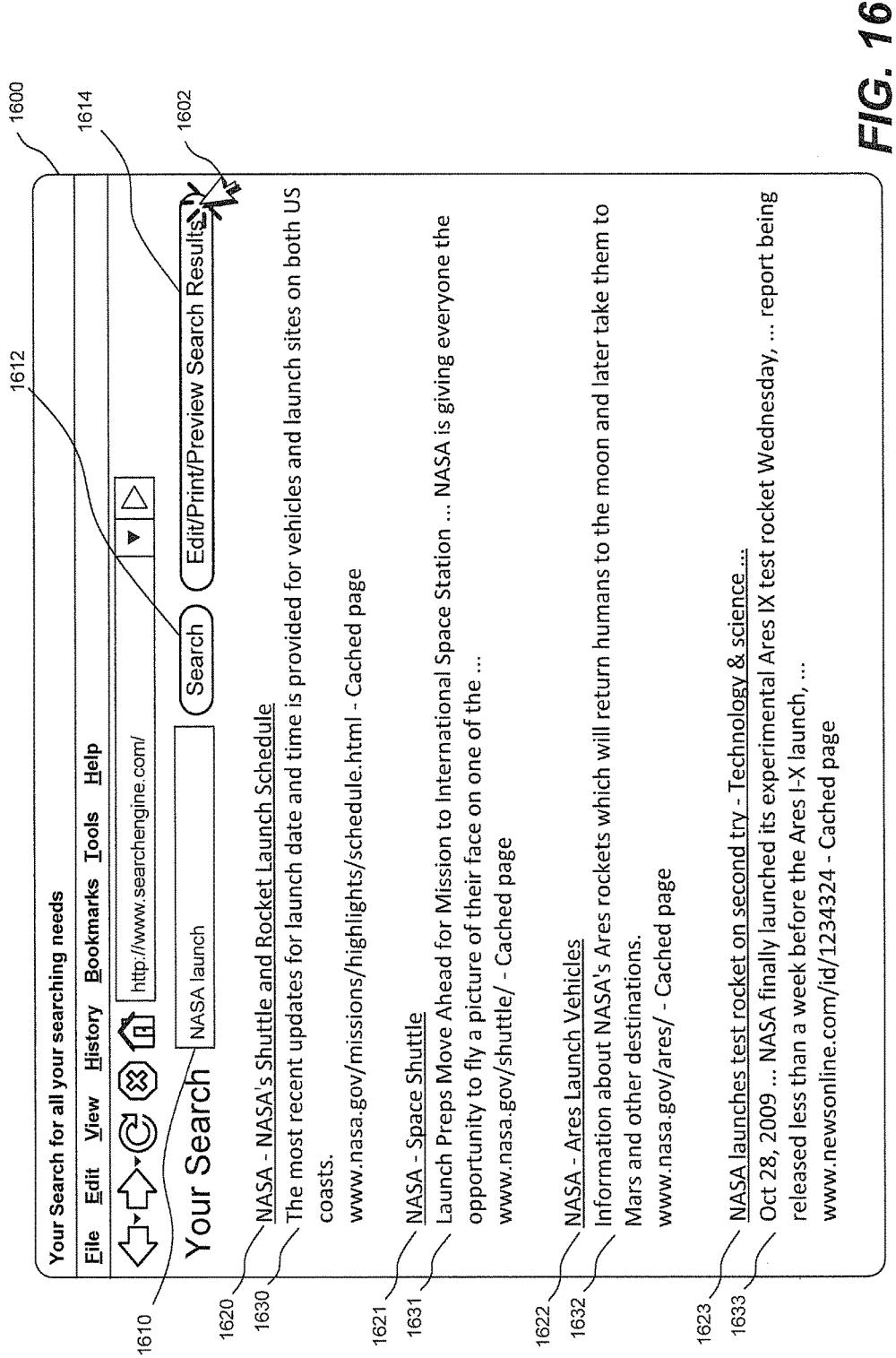
FIG. 16 depicts a particular embodiment of a user interface display including a list of search results returned by a search engine.

FIG. 16 illustrates a user interface including a list of search results 1600 returned by a search engine from which a user may generate a modified list of search results. The list of search results 1600 may be presented by a browser adapted to present an option 1614 to modify the list of search results 1600. The option 1614 to modify the list of search results 1600 may, for example, be presented as a button selectable via the user interface to enable the user to edit, print, or preview the search results. The user can select the option 1614, for example, by manipulating a cursor 1602 with a pointing device to select the option 1614.

In the example of FIG. 16, the user has previously entered search terms "NASA launch" to generate the list of search results 1600. The search terms may be presented in a search bar 1610. Based on contents of the list of search results 1600, the user may choose to modify the search terms presented in the search bar 1610 and execute a new search by selecting a search option 1612. The list of search results 1600 illustrated includes four search results 1620-1623. In the example of FIG. 16, each of the search results 1620-1623 includes a web page. Each of the search results 1620-1623 is identified by a name. Further, each of the search results 1620-1623 may be presented with a content element 1630-1633, respectively. The content elements 1630-1633 may be default content elements. For example, the default content element may be automatically selected by the search engine or may be specified by metadata included within a particular search result. The content elements 1630-1633 may include, for example, a portion of text, one or more images, a uniform resource locator (URL), etc. To illustrate, the first content element 1630 may include a portion of a document corresponding to the first search result 1620 that includes the search terms. In some cases, one or more of the content elements 1630-1633 may include information that is not useful to the user or that does not assist the user in understanding why the corresponding search result 1620-1623 is worth preserving. By using the cursor 1602 to select the option 1614 to modify the search results, the user may be able to modify the list of search results 1600 to create a more useful document.

Figure 17:
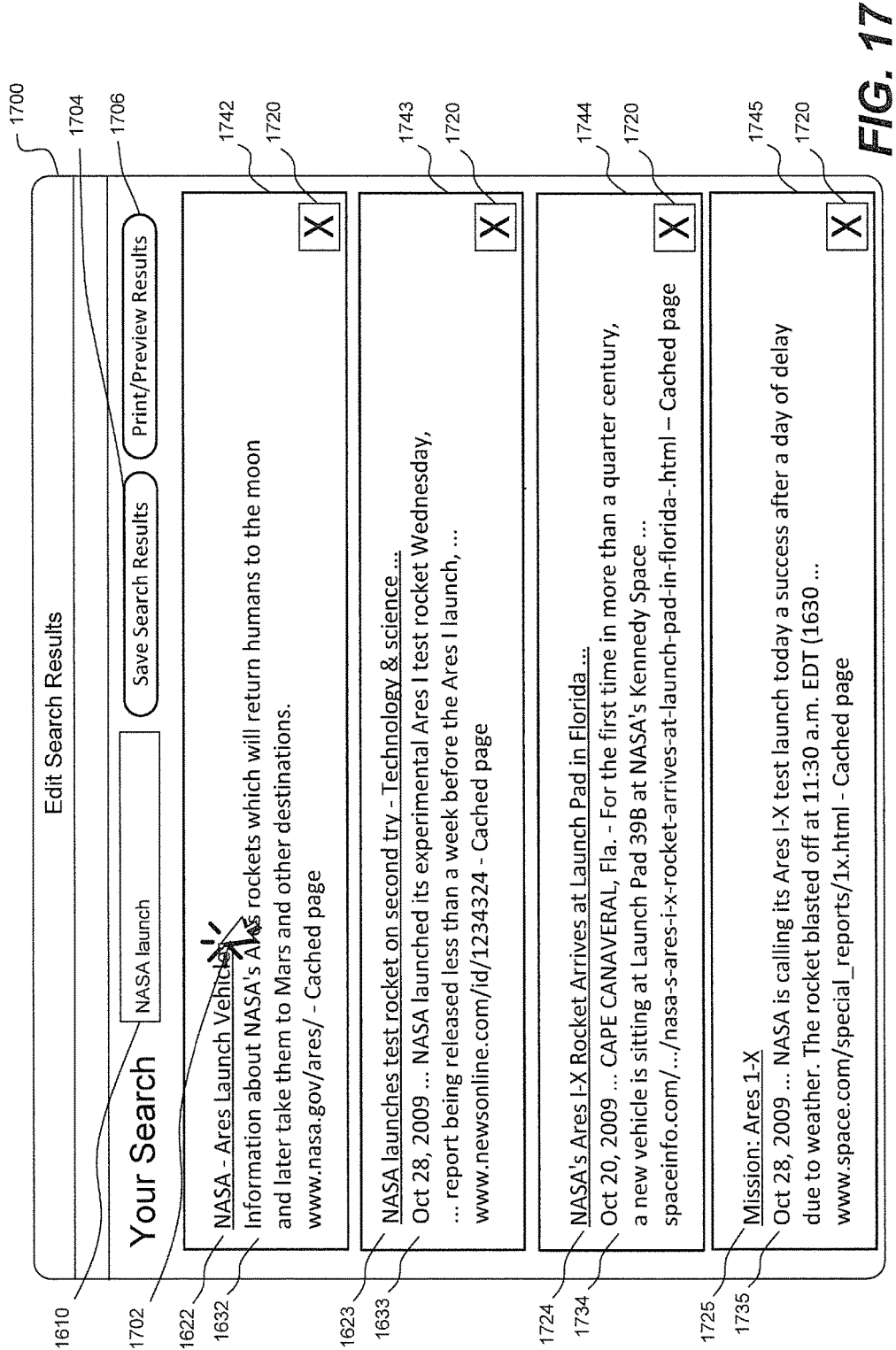
FIG. 17 depicts a particular embodiment of a user interface display including a modifiable list of search results generated from the list of search results from FIG. 16.

FIG. 17 is a user interface that includes a modified list of search results 1700. The modified list of search results is modified relative to the list of search results 1600 of FIG. 16. In a particular embodiment, the modified list of search results 1700 is presented by the results interface 1510 of FIG. 15. As described with reference to FIGS. 7-11, the user may modify a list of search results by deleting some of the results included in the list or by reordering some of the results included in the list. For example, to generate the modified list of search results 1700, the user has deleted search results 1620 and 1621 from the list of search results 1600. Consequently, search results 1622 and 1623 have moved to a top of the modified list of search results 1700 and search results 1724 and 1725 now appear following search result 1623. To facilitate modifying the list of search results, each of the search results may be associated with a delete option 1720 that the user may select with a cursor 1702 to delete a search result from the modified list of search results 1700.

The user may also modify the modified list of search results 1700 to include different or additional information associated with each of the search results 1622, 1623, 1724, and 1725. For example, the user may modify or replace the content elements 1632, 1633, 1734, and 1735. When the user is satisfied with the modified list of search results 1700, the user may select an option 1704 to save the modified list of search results 1700 or an option 1706 to print (or view a print preview of) the modified list of search results 1700.

Figure 18:
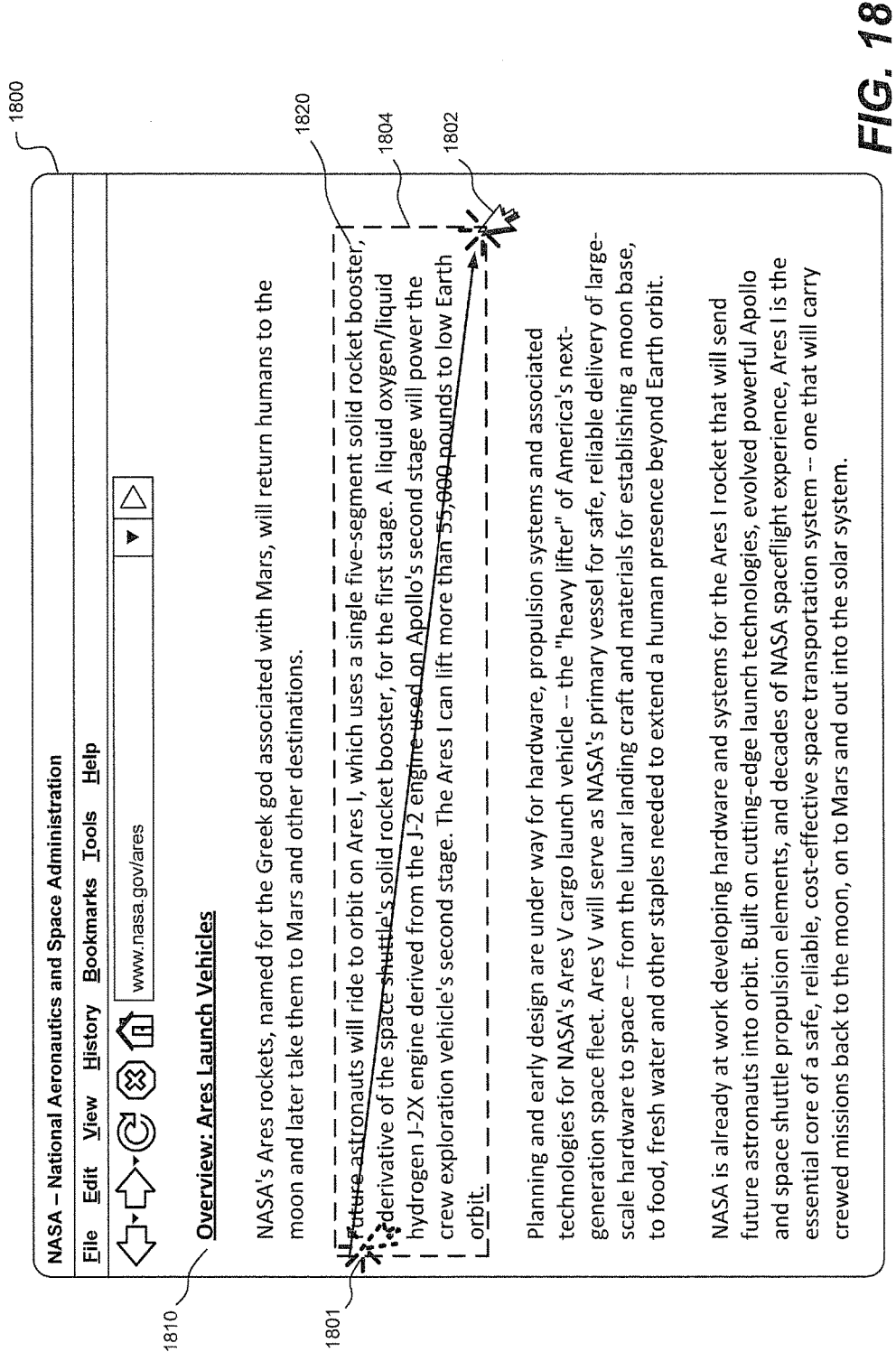
FIG. 18 depicts a particular embodiment of a user interface display including a particular document associated with a search result of FIG. 17.

FIG. 18 illustrates an embodiment of a user interface display including a first document 1800. The first document 1800 may correspond to the first search result 1622 of FIGS. 16-17. For example, the document 1800 may be displayed in response to user selection of the first search result 1622 from the modified list of search results 1700 of FIG. 17. In a particular illustrative embodiment, the document 1800 is a web page that is automatically retrieved by the retrieval interface 1520 of FIG. 15 in response to the user's selection of the first search result 1622.

To add or change content in the modified list of search results 1700, the user may engage the content interface 1550 of FIG. 15 to select a content element 1820 of the first document 1800 to include in the modified list of search results 1700. In a particular illustrative embodiment, the content interface 1550 is automatically engaged when the user selects a portion of the first document 1800. In the example of FIG. 18, the user selects the content element 1820 by dragging the cursor 1802 from a first position of the cursor 1801 (shown in dotted lines) corner-to-corner over an area 1804 that includes the content element 1820. In a particular illustrative embodiment, in response to the user's selection of the content element 1820, the content element 1820 is automatically inserted into the modified list of search results 1700 and associated with the first search result 1622.

Figure 19:
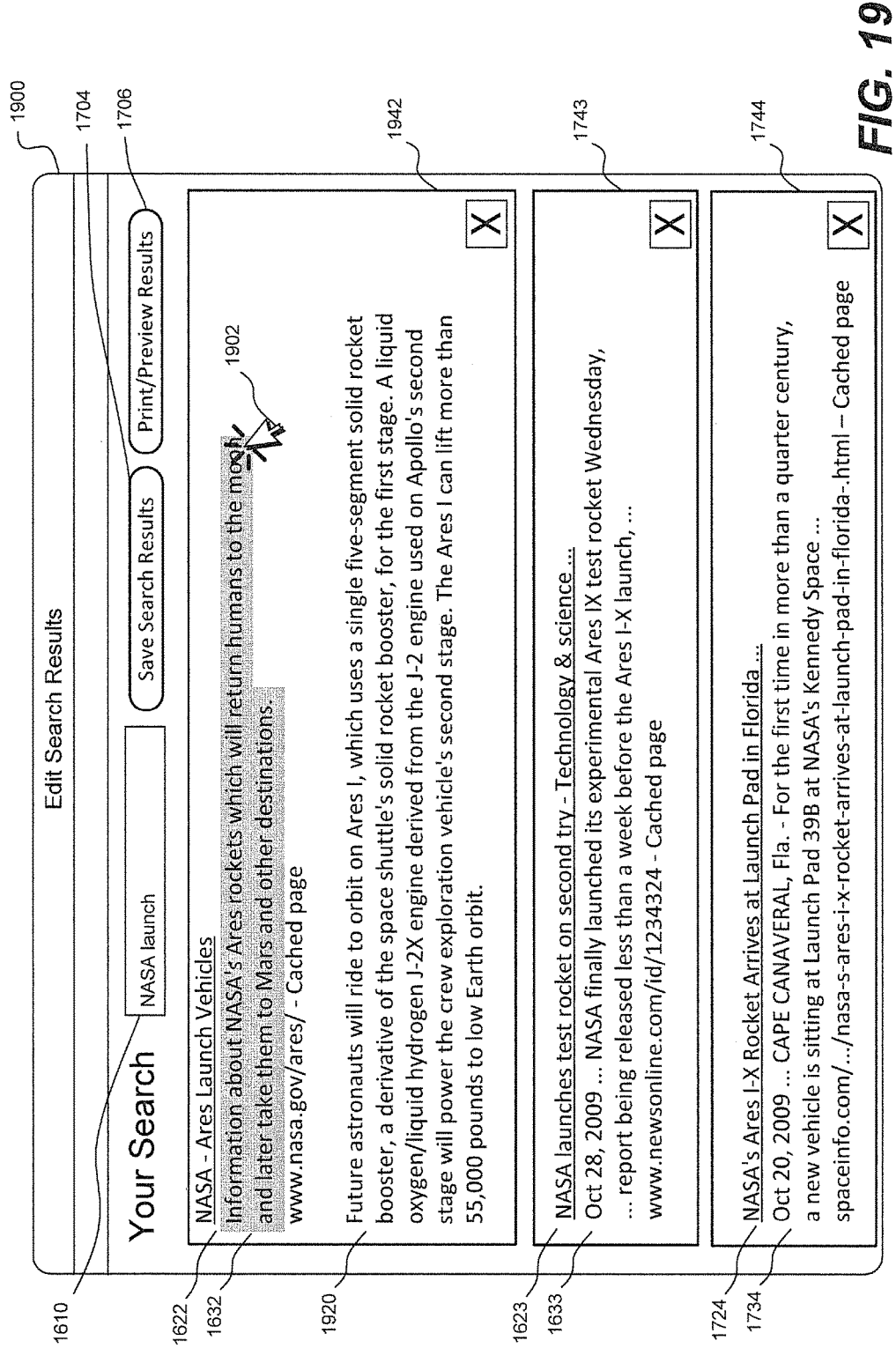
FIG. 19 depicts a particular embodiment of a user interface display including the modifiable list of search results of FIG. 17 in which an entry for the selected document is modified to include the content element of the particular document selected by the user in FIG. 18.

FIG. 19 illustrates an embodiment of a user interface display including a modified list of search results 1900. The modified list of search results 1900 is changed relative to the modified list of search results 1700 of FIG. 17 in that the content element 1820 selected by the user from the first document 1800 of FIG. 18 has been added to the modified list of search results 1900. In particular, the content element 1820 selected from the first document 1800 has been automatically appended to an entry 1942 associated with the first search result 1622.

The user may further modify the modified list of search results 1900 if desired. For example, the user may delete the content 1632 that was originally associated with the first search result 1622. For example, the original content 1632 may be deleted by highlighting the original content 1632 and then pressing a delete key or otherwise submitting a delete command.

FIG. 20 illustrates an embodiment of a user interface display including a modified list of search results 2000. The modified list of search results 2000 is changed relative to the modified list of search results 1900 of FIG. 19 in that the original content 1632 has been deleted from an entry 2042 associated with the first search result 1622. Thus, according to a particular illustrative embodiment, the user can edit a list of search results until the modified list of search results 2000 includes only content that the user desires to preserve.

The user may edit multiple entries of the modifiable list of search results 2000. For example, after editing the entry 2042 associated with the first search result 1622, the user may edit the content element 1633 associated with the second search result 1623.

Figure 21:
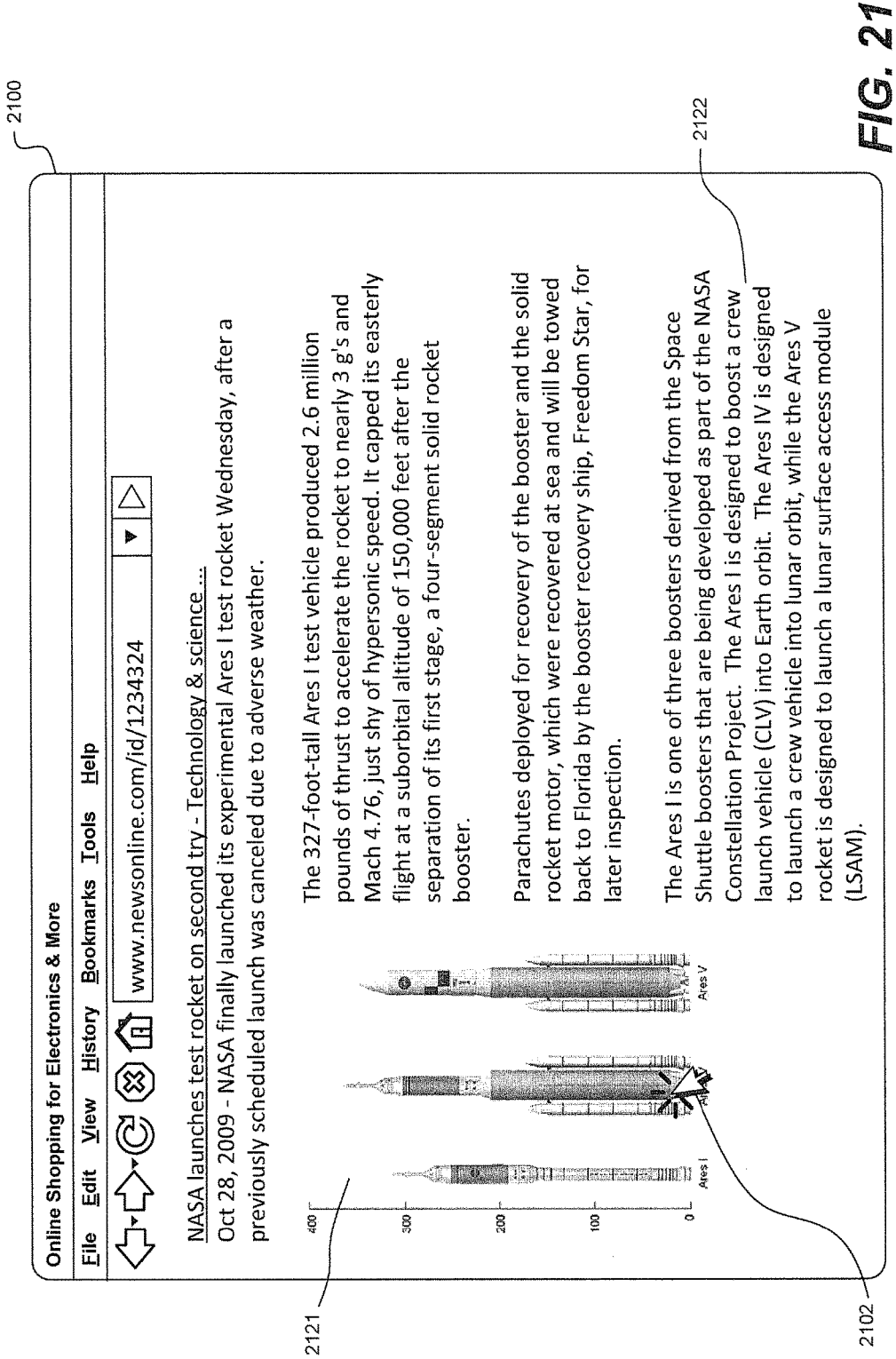
FIG. 21 depicts a particular embodiment of a user interface display including a second particular document selected by the user from the modifiable list of search results of FIG. 20 and from which the user selects an image.

FIG. 21 illustrates an embodiment of a user interface display including a second document 2100. For example, the second document 2100 may be retrieved from the information source 1560 of FIG. 15 in response to the user selecting the second search result 1623 from the modified list of search results 2000 of FIG. 20. The second document 2100 may include an image 2121 that is of interest to the user and that the user wishes to include in the modified list of search results 2000 in association with the second search result 1623. In a particular illustrative embodiment, the user may select the image 2121 by selecting it using a cursor 2102 or using another method.

Figure 22:
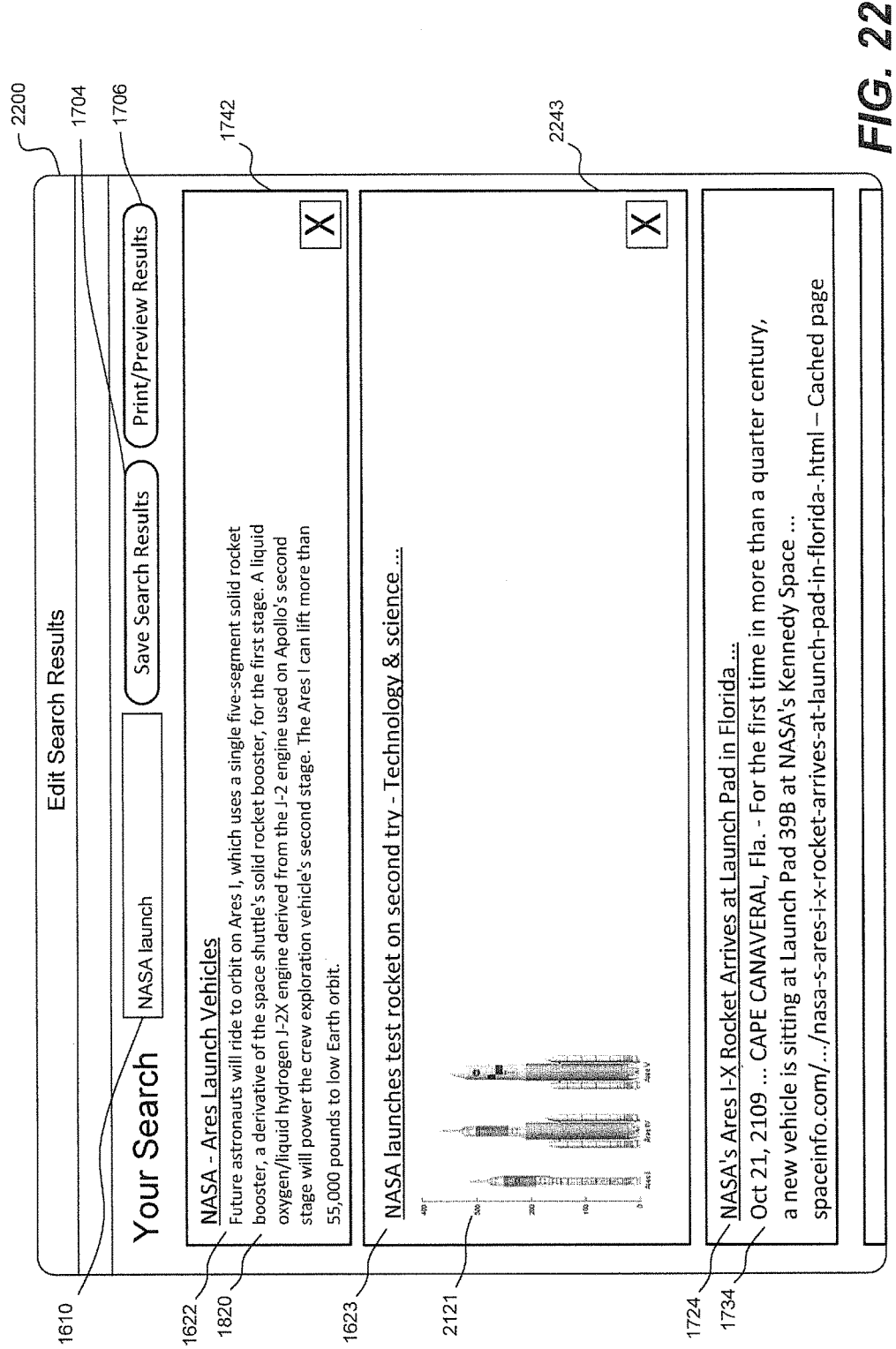
FIG. 22 depicts a particular embodiment of a user interface display including the modifiable list of search results of FIG. 20 further modified to include the image selected in FIG. 21 instead of content previously included for the second particular document.

FIG. 22 illustrates an embodiment of a user interface display including a modified list of search results 2200. The modified list of search results 2200 is changed relative to the modified list of search results 2000 of FIG. 20 in that the image 2121 has been included in the modified list of search results 2200 and associated with the second search result 1623. In the modified list of search results 2200, the image 2121 has replaced the content previously associated with the second search result 1623. Thus, content in an entry 2243 associated with the second search result 1623 includes the image 2121 selected from the second document 2100.

In a particular illustrative embodiment, changing content of the entry 2243 associated with the second search result 1623 does not affect modifications made with respect to other search results. For example, the change to the entry 2243 associated with the second search result 1623 does not affect modifications made to the entry 1742 associated with the first search result 1622.

Figure 23:
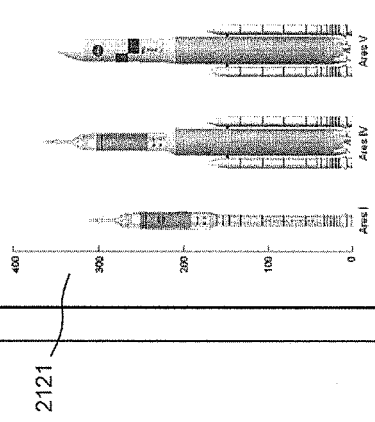
FIG. 23 depicts a particular embodiment of a user interface display including the modifiable list of search results of FIG. 22 to which additional content from the second particular document is added.

FIG. 23 illustrates an embodiment of a user interface display including a modified list of search results 2300. The modified list of search results 2300 is changed relative to the modified list of search results 2200 of FIG. 22 in that additional content 2122 from the second document 2100 of FIG. 21 has been included in an expanded entry 2343 associated with the second search result 1623. Thus, according to a particular illustrative embodiment, the user can continue to modify content associated with a search result in the modified list of search results 2300 by adding or removing content (including text, images or both).

Figure 24:
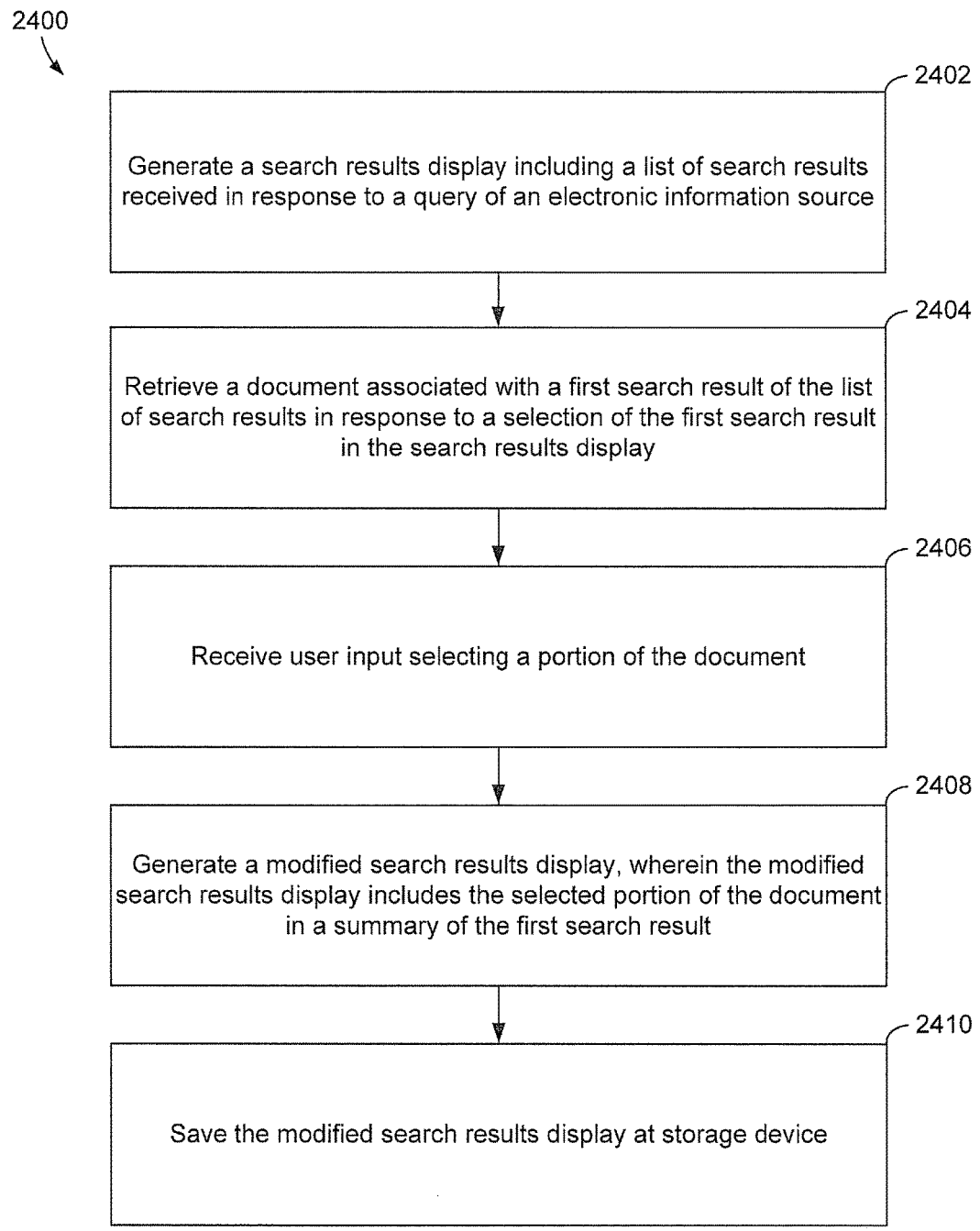
FIG. 24 is a flow diagram of a first particular embodiment of a method of enabling a user to modify a list of search results.

FIG. 24 is a flow diagram of a first particular embodiment of a method 2400 of enabling a user to modify a list of search results. For example, the method 2400 may enable a user to modify a list of search results to include one or more selected content entries. A search results display including a list of search results received in response to a query of an electronic information source may be generated, at 2402. For example, the list of search results may be retrieved from an information source such as a search engine or database manager and may be presented via a results interface. A document associated with a first search result of the list of search results may be retrieved in response to a selection of the first search result in the search results display, at 2404. For example, as described with reference to FIG. 17, a user may manipulate the cursor 1702 to select the first search result 1622 to invoke the retrieval interface 1520 of FIG. 15 to present the document 1800 of FIG. 18.

User input selecting a portion of the document may be received, at 2406. A modified search results display may be generated, at 2408. The modified search results display may include the selected portion of the document in a summary of the first search result. For example, as described with reference to FIGS. 15, 18, and 21, the content interface 1550 may be engaged in response to the user input to enable the user to select a content element, such as the content element 1820, from the document 1800. The list of search results is modified so that the selected portion of the content of the document is presented with a corresponding search result. The modified search results display may be saved at storage device, at 2410.

Figure 25:
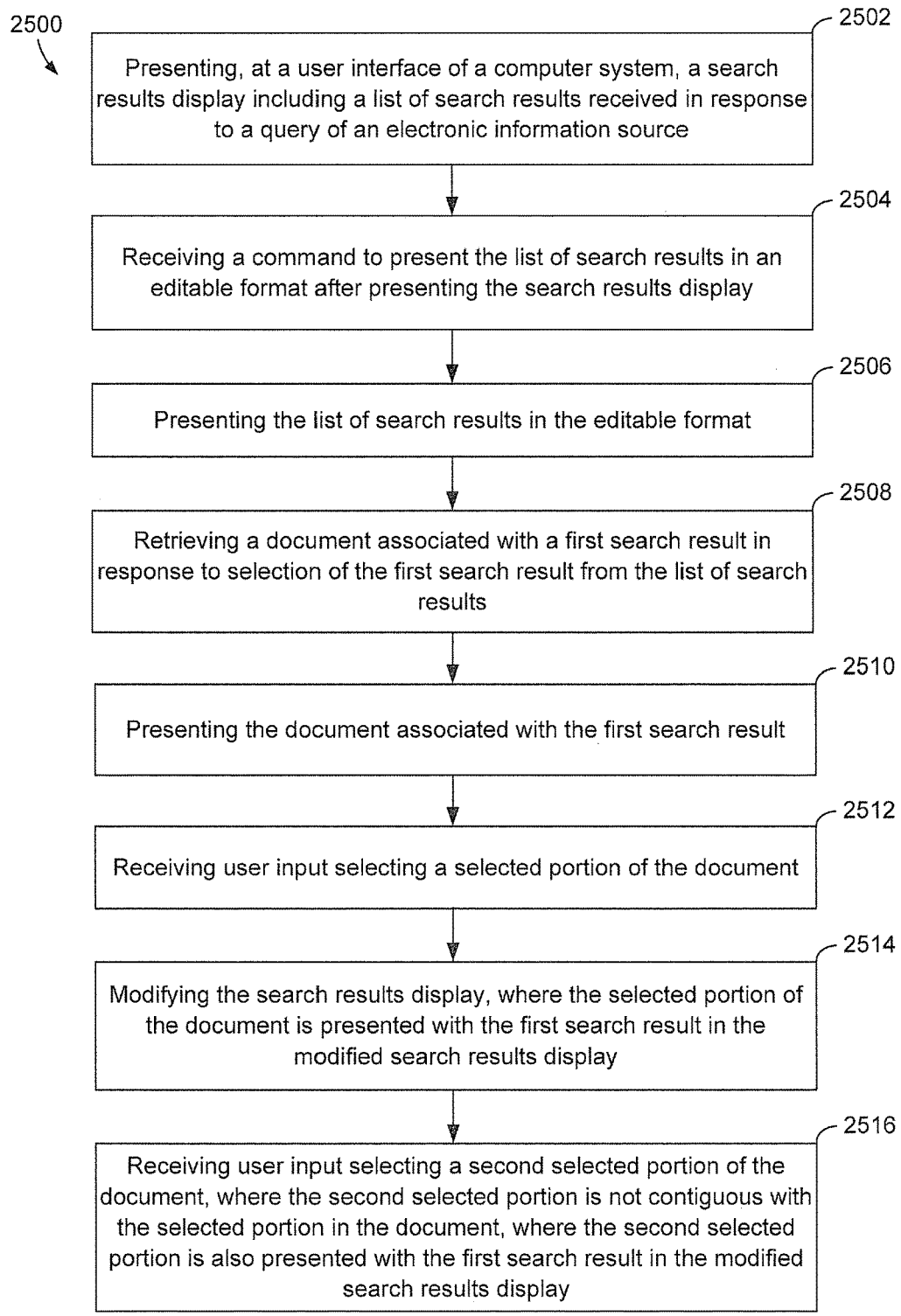
FIG. 25 is a flow diagram of a second particular embodiment of a method of enabling a user to modify a list of search results.

FIG. 25 is a flow diagram of a second particular embodiment of a method 2500 of enabling a user to modify a list of search results. For example, the method 2500 may enable a user to modify a list of search results to include one or more selected content entries.

A search results display may be presented at a user interface of a computer system, at 2502. The user interface may include a list of search results received in response to a query of an electronic information source. A command to present the list of search results in an editable format may be received after presenting the search results display, at 2504, and the list of search results may be presented in the editable format, at 2506.

A document associated with a first search result may be retrieved in response to selection of the first search result from the list of search results, at 2508. The document associated with the first search result may be presented, at 2510. User input selecting a first selected portion of the document may be received, at 2512.

The search results display may be modified, at 2514. For example, the selected portion of the document may be presented with the first search result in the modified search results display. User input selecting a second selected portion of the document may be received, at 2516. The second selected portion may not be contiguous with the first selected portion in the document. For example, the first selected portion and the second selected portion may be from different areas of the document. Additionally, the first selected portion and the second selected portion may include different types of content. For example, the first selected portion may include an image and the second selected portion may include text, or vice versa. The second selected portion may be presented with the first search result in the modified search results display.

Figure 26:
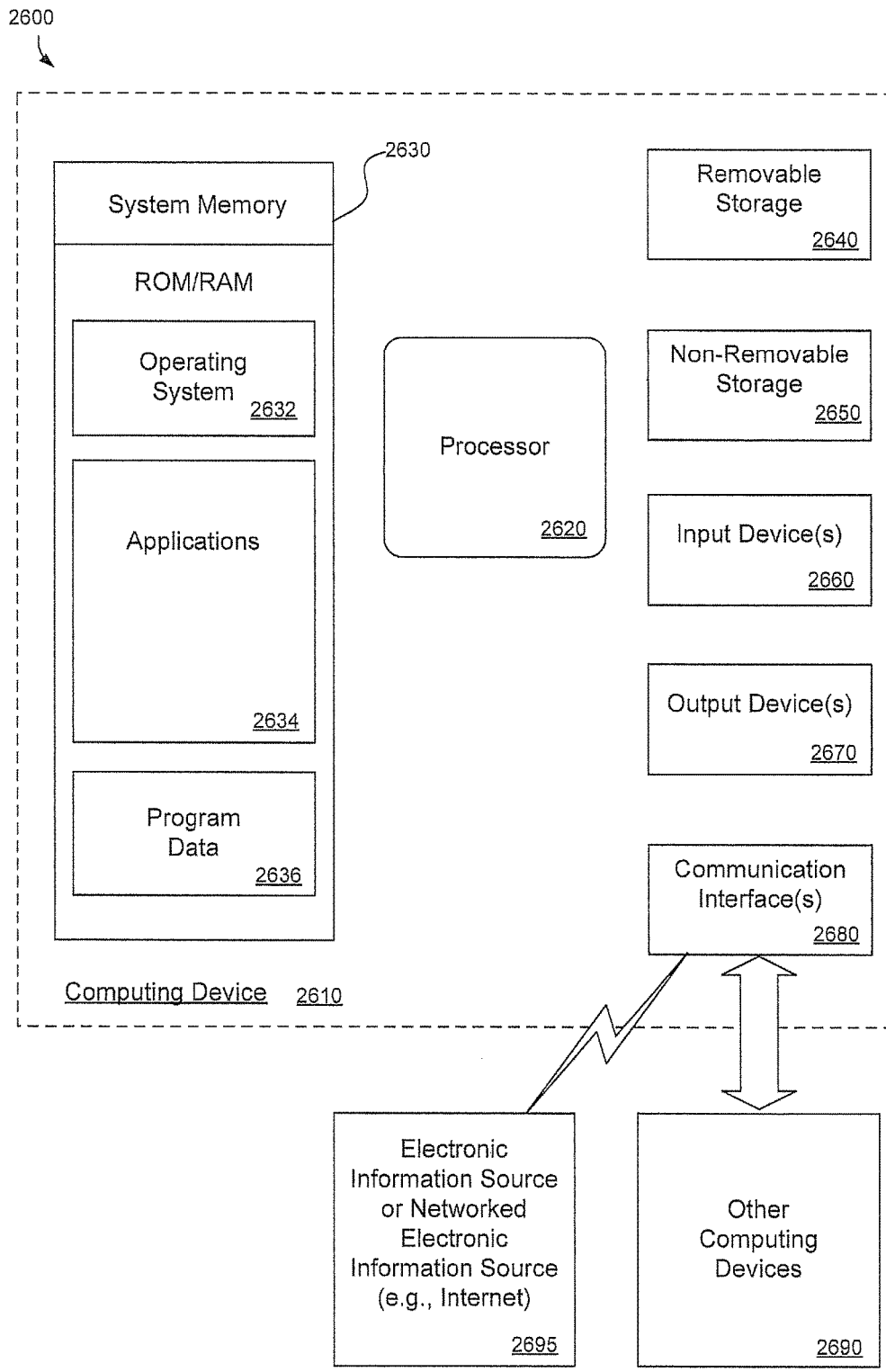
FIG. 26 is a block diagram of a general purpose computer system operable to implement embodiments of the disclosed computer-implemented methods and computer-executable instructions.

FIG. 26 is a block diagram 2600 of a general purpose computer system operable to implement embodiments of computer-implemented methods and computer-executable instructions, such as instructions to perform the methods of any one or more of FIGS. 13, 14, 24 and 25. In an illustrative embodiment, a computing device 2610 includes a workstation configured to access networked sources of information over a network in order to submit a query, to view search results, to select search results and properties, to modify the selections of search results and properties, or cause the results to be printed, saved, or otherwise output. The computing device 2610 may include at least one processor 2620. Within the computing device 2610, the processor 2620 communicates with a system memory 2630, one or more storage devices 2640 and 2650, one or more input devices 2660, one or more output devices 2670, and one or more communication interfaces 2680.

The system memory 2630 may include volatile memory devices, such as random access memory (RAM) devices, and nonvolatile memory devices, such as read-only memory (ROM), programmable read-only memory, and flash memory. The system memory 2630 typically includes an operating system 2632, which may include a basic/input output system for booting the computing device 2610 as well as a full operating system to enable the computing device 2610 to interact with users, other programs, and other devices. The system memory 2630 may also include one or more application programs 2634, such as a browser application and components of a search results output tool, as previously described. The system memory 2630 also may include program data 2636, such as a plurality of search results and user selections of search results and properties, as previously described. The processor 2620 also communicates with one or more removable storage devices 2640 and non-removable storage devices 2650. The removable storage devices 2640 may include nonvolatile storage devices, such as magnetic disks, optical disks, or flash memory devices. The non-removable storage devices 2650 may include one or more of magnetic disks and nonvolatile memory. The storage devices 2640 and 2650 may be configured to store the operating system 2632, the applications 2634, the program data 2636, or any combination thereof. Results of the search results output tool may be stored on the removable storage 2640, the non-removable storage 2650, or both.

The processor 2620 may also communicate with the one or more input devices 2660 to enable the computing device 2610 to receive input from a user. The input devices 2660 may include keyboards, pointing devices, microphones, and other devices. The processor 2620 may also communicate with the one or more output devices 2670 that enable the computing device 2610 to provide output to the user. The output devices 2670 may include one or more displays, speakers, and one or more printers or other hardcopy output devices.

The processor 2620 may communicate with the one or more communication interfaces 2680 to enable the computing device 2610 to communicate with other computing devices 2690. The one or more communications interfaces 2680 may also enable the computing device 2610 to communication with electronic information sources or network electronic information sources 2695, such as databases, intranets, or the Internet. The one or more communication interfaces 2680 may include wired Ethernet interfaces, IEEE 802.11 wireless interfaces, Bluetooth communication interfaces, or other network interfaces.

Not all of the components or devices illustrated in FIG. 26 or otherwise described in the previous paragraphs are necessary to support implementations of the present disclosure. For example, a handheld device may include a single system memory 2630, such as a flash memory, configured to store the operating system 2632, one or more of the applications 2634, and the program data 2636. Additionally, a device may or may not include removable storage 2640. In addition, the communication interfaces 2680 may include only a radio transceiver and/or a Universal Serial Bus (USB) connection port for backup, update, and networking functions.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than is shown in the figures or one or more method steps may be omitted. Accordingly, the disclosure and the figures are to be regarded as illustrative rather than restrictive.

Moreover, although specific embodiments have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, the claimed subject matter may be directed to less than all of the features of any of the disclosed embodiments.

What is claimed is:

1. A method, comprising:
presenting a search results display including a list of search results responsive to a query;
receiving a first user input selecting a first search result from the list of search results;
retrieving and presenting a document associated with the first search result;
receiving a second user input selecting a first portion of the document;
in response to receiving the second user input, automatically, without additional user input, incorporating the first portion of the document into the list of search results as an additional search result, wherein, after the first portion is incorporated into the list of search results, the list of search results includes the additional search result and the first search result, and wherein the first portion identifies a significance of the document; and
modifying the list of search results by including an image that is associated with a second search result in the list of search results, wherein the image is a user selected image that is part of a second document associated with the second search result that identifies a significance of the second document, and wherein the image replaces content previously associated with the second search result.

2. The method of claim 1, wherein the search results display is presented in response to querying an electronic information source.

3. The method of claim 2, wherein the electronic information source includes an Internet source.

4. The method of claim 1, further comprising:
receiving a command to present the list of search results in an editable format after presenting the search results display; and
presenting the list of search results in the editable format.

5. The method of claim 4, wherein the command to present the list of search results in the editable format includes one of:
an edit search results command;
a save search results command;
a print search results command; and
a print preview search results command.

6. The method of claim 4, further comprising:
receiving third user input indicating that a portion of information associated with a particular search result included in the list of search results has been highlighted to generate highlighted information; and
in response to receiving a delete command, deleting the highlighted information from the list of search results, wherein, after the highlighted information is deleted, the list of search results includes the particular search result and a non-highlighted portion of the information associated with the particular search result.

7. The method of claim 4, further comprising:
receiving a format command associated with a third search result of the list of search results; and
modifying a display format of the third search result in the search results display.

8. The method of claim 1, wherein the second user input does not include a user pressing an on-screen button.

9. The method of claim 1, wherein the first portion of the document includes text, at least one image, or both.

10. The method of claim 1, further comprising:
receiving an additional user input selecting a second selected portion of the document that is not contiguous in the document with the first portion of the document; and
incorporating the second selected portion into the first search result within the search results display.

11. The method of claim 10, wherein the list of search results includes default content associated with the first search result, and wherein incorporating the second selected portion into the first search result includes appending the second selected portion to the default content associated with the first search result.

12. The method of claim 1, wherein the document includes a web page.

13. The method of claim 1, further comprising generating an output of the list of search results, wherein the output is in the form of a formatted file.

14. A system comprising:
a processor; and
a memory accessible to the processor, the memory including instructions executable by the processor to:
present a search results display including a list of search results responsive to a query, wherein a first search result of the list of search results is associated with a document;
receive a first user input selecting the first search result;
retrieve and present the document associated with the first search result in response to the first user input;
receive a second user input indicating that a portion of the document has been highlighted to generate a highlighted portion of the document;
in response to receiving the second user input, automatically, without additional user input, incorporate the highlighted portion of the document into the list of search results as an additional search result, wherein the list of search results includes the additional search result and the first search result, and wherein the highlighted portion identifies a significance of the document; and
modify the list of search results by including an image that is associated with a second search result in the list of search results, wherein the image is a user selected image that is part of a second document associated with the second search result that identifies a significance of the second document, and wherein the image replaces content previously associated with the second search result.

15. The system of claim 14, wherein the instructions to present the search results display are part of a browser application and wherein instructions to receive user input selecting the highlighted portion and the instructions to incorporate the highlighted portion into the list of search results are part of a browser plug-in software module or an applet executable via the browser application.

16. The system of claim 14, wherein the highlighted portion includes text, a second image, or both.

17. A system comprising:
a processor; and
a memory accessible to the processor, the memory including instructions executable by the processor to:
present a search results display including a list of search results responsive to a query, wherein a first search result of the list of search results is associated with a document;
receive a first user input selecting the first search result;
retrieve and present the document associated with the first search result in response to the first user input;

receive a second user input indicating that a portion of the document has been highlighted to generate a highlighted portion of the document;

in response to receiving the second user input, automatically, without additional user input, generate a modified list of search results by incorporating the highlighted portion of the document into the list of search results as an additional search result, wherein the modified list of search results includes the additional search result and the first search result, and wherein the highlighted portion identifies a significance of the document;

modify the list of search results by including an image that is associated with a second search result in the list of search results, wherein the image is a user selected image that is part of a second document associated with the second search result that identifies a significance of the second document, and wherein the image replaces content previously associated with the second search result; and store the modified list of search results.

18. A computer-readable storage device comprising instructions that are executable by a processor to:

generate a search results display including a list of search results responsive to a query;

receive a first user input selecting a first search result from the list of search results;

retrieve and present a document associated with the first search result;

receive a second user input selecting a first portion of the document;

in response to receiving the second user input, automatically, without additional user input, incorporate the first portion of the document into the list of search results, wherein the list of search results includes default content associated with the first search result, wherein incorporating the first portion of the document into the list of search results includes replacing the default content associated with the first search result with the first portion of the document, and wherein the first portion identifies a significance of the document;

receive a third user input indicating that at least a portion of information included in the first portion presented in the first search results has been highlighted to generate a highlighted portion of the information;

in response to receiving a delete command, delete the highlighted portion of the information from the first search result, wherein, after the highlighted portion of the information is deleted from the first search result, the list of search results includes a non-highlighted portion of the information included in the first portion of the document; and modify the list of search results by including an image that is associated with a second search result in the list of search results, wherein the image is a user selected image that is part of a second document associated with the second search result that identifies a significance of the second document, and wherein the image replaces content previously associated with the second search result.

19. The computer-readable storage device of claim 18, wherein the first portion includes text, a second image, or both.

20. The computer-readable storage device of claim 18, wherein the image is included in the list of search results in response to a fourth user input indicating user selection of the image in the second document.

21. The computer-readable storage device of claim 20, further comprising an output interface configured to generate an output of the list of search results, wherein the output is in the form of a formatted file.

22. A computer-readable storage device comprising instructions that are executable by a processor to:

generate a search results display including a list of search results responsive to a query;

receive a first user input selecting a first search result from the list of search results;

retrieve and present a document associated with the first search result;

receive a second user input selecting a first portion of the document;

in response to receiving the second user input, automatically, without additional user input, incorporate the first portion of the document into the list of search results, wherein the list of search results includes default content associated with the first search result, wherein incorporating the first portion of the document into the list of search results includes replacing the default content associated with the first search result with the first portion of the document, and wherein the first portion identifies a significance of the document;

receive a third user input indicating that at least a portion of information included in the first portion presented in the first search results has been highlighted to generate a highlighted portion of the information;

in response to receiving a delete command, delete the highlighted portion of the information from the first search result, wherein, after the highlighted portion of the information is deleted from the first search result, the list of search results includes a non-highlighted portion of the information included in the first portion of the document;

modify the list of search results by including an image that is associated with a second search result in the list of search results, wherein the image is a user selected image that is part of a second document associated with the second search result that identifies a significance of the second document, and wherein the image replaces content previously associated with the second search result; and after the highlighted portion of the information is deleted, save the list of search results at a second storage device.

\* \* \* \* \*